United States Patent [19]
Al-Housseini

[11] Patent Number: 6,056,552
[45] Date of Patent: May 2, 2000

[54] LANGUAGE ANALYSIS INSTRUMENT

[76] Inventor: Talal Al-Housseini, Attiyah Building, Australia St., Rawche, Beirut, Lebanon

[21] Appl. No.: 08/637,745
[22] PCT Filed: Oct. 20, 1994
[86] PCT No.: PCT/GB94/02311
   § 371 Date: May 29, 1996
   § 102(e) Date: May 29, 1996
[87] PCT Pub. No.: WO95/12189
   PCT Pub. Date: May 4, 1995

[30] Foreign Application Priority Data

Oct. 27, 1993 [GB] United Kingdom ................... 9322112

[51] Int. Cl.⁷ .................................................. G09B 19/04
[52] U.S. Cl. ........................................... 434/185; 434/156
[58] Field of Search ................................ 434/157; 704/3, 704/211, 2, 4, 1; 84/104, DIG. 12

[56] References Cited

U.S. PATENT DOCUMENTS

| | | | |
|---|---|---|---|
| 4,089,246 | 5/1978 | Kooker | 84/470 |
| 4,580,133 | 4/1986 | Matsuoka et al. | 340/701 |
| 4,583,443 | 4/1986 | Senghaas et al. | 84/484 |
| 4,919,030 | 4/1990 | Perron | 84/470 |
| 4,969,194 | 11/1990 | Ezawa et al. | 381/48 |
| 5,287,789 | 2/1994 | Zimmerman | 84/477 |
| 5,511,053 | 4/1996 | Jae-Chang | 369/54 |
| 5,525,062 | 6/1996 | Ogawa | 434/307 R |

FOREIGN PATENT DOCUMENTS

| | | |
|---|---|---|
| 5224688 | 9/1993 | Japan . |
| 2 080 604 | 2/1982 | United Kingdom . |
| WO 83/02508 | 7/1983 | WIPO . |
| WO 92/11618 | 7/1992 | WIPO . |

Primary Examiner—Valencia Martin-Wallace
Assistant Examiner—David Aaron Fleming
Attorney, Agent, or Firm—Young & Thompson

[57] ABSTRACT

The invention relates to an instrument for analysis of rhythmic measures of speech. One input device is operable to generate input signals representing the rhythm of a group of syllables and an output device responds to these signals and provides a representation of the input rhythm and an indication of the relationship of the input rhythm to a known or predetermined rhythm. The visual representation may be in the form of a numerical display such as comprising symbols representing different rhythmic measures of speech. The input device may be a push button to open and close a switch in a rhythm corresponding to that in which a group of syllables such as a line of verse would be spoken or read. The instrument allows information to be entered rapidly and simply and the different between spoken and written language presents no difficulty. The instrument can be used for interactive educational purposes and it improves hand movement and speech coordination as well as assisting the translation of tests set to music. The instrument can also assist a user in modifying his or her spoken and/or written language in accordance with a desired effect or to conform with existing models.

28 Claims, 25 Drawing Sheets

FIG. 9

LANGUAGE ANALYSIS INSTRUMENT

The invention relates to an instrument for analysis of the rhythmic measures of speech.

In accordance with the invention, there is provided an instrument for analysis of the rhythmic measures of speech comprising at least one input device operable to generate input signals representing the rhythm of a group of syllables, and an output device responsive to the signals to provide at least one of a representation of the input rhythm and an indication of a relationship of the input rhythm to a known or predetermined rhythm.

The or each input device is preferable such as to be operated by the user manually in a very simple way, as by operation of a push-button to open and close switch in a rhythm corresponding to that in which a group of syllables would be spoken or read. The input device thus provides the input signal simulating the meter of rhythm of the group of syllables, which group typically comprises at least part of a line of verse, typically a first hemistich, although it could equally well comprise a phrase from a rhythmical prose composition.

Information can thus be entered into the instrument rapidly and in a very simple way requiring hardly any prior training. No difficulty arises from the differences between spoken and written language.

The input rhythm can additionally or instead be displayed audibly. The input rhythm can be stored within the instrument if desired and can be retrieved as required for visual/or aural display.

The output device can function in one or more of a variety of ways. Thus the input rhythm can be displayed symbolically, as by a sequence of different symbols indicating different length syllables.

For classification and analysis, the output device can include a store storing therein at least one signal set representing a known or predetermined rhythm, a comparator for comparing the input signals with at least one stored signal set, and signaling means indicating a relationship between the rhythms represented by the input signals and the stored signal set. Preferably, the store stores a plurality of the signal sets, each representing a respective known or predetermined rhythm, typically the rhythms of different verse forms, and a selector device is provided to permit the user to select a particular signal set for comparison with the input signals. The output device is then desirably operable selectively to provide at least one of a visual and an aural representation of the stored signal set, or of the selected one of the stored signal sets.

The output of the comparator can be applied in various ways depending on whether the instrument is intended to operate for classification and analysis, for educational purposes or for entertainment. Preferably the instrument is capable of operation in a selected one of a plurality of such modes.

The comparator can instead be arranged to cause the signaling means to indicate a rhythm in continuation of that of the input signals in response to agreement between the input signals and the signal set or the selected signal set. For example, the user having established that the input signals represent a first hemistich, he can be given a hint as to how to compose a successive hemistich.

The comparator can moreover be arranged to cause the signaling means to indicate an error or omission in response to a different between the input signals and the stored signal set or the selected signal set. The user then can correct the input rhythm, or test it against other selected signal sets until a corresponding known rhythmic form has been located.

Preferably means are provided for varying the speed of operation of the instrument, for example, means can be provided for selection of one of a plurality of tempi of operation of the instrument, conveniently a slow, a fast, and an intermediate tempo.

For interactive educational purposes, or for use in a competitive game mode, a plurality of the input devices can be provided for use by a plurality of users. The users can for example take turns to input a hemistich to follow a first hemistich taken from the store and displayed on a large visual screen.

The instrument provides an electronic keyboard for the analysis and classification of the rhythmic measures of spoken or written language, which provides for its user an aural, visual and quantified representation of the rhythms of speech. The instrument can be employed to assist the user in modifying his or her spoken and/or written language in accordance with the desired effects, and to conform with existing models. The rhythm entered into the instrument can be analyzed and classified in accordance with selected parameters.

An instrument embodying the invention can thus be employed educationally to assist the user in acquiring compositional skills through step-by-step training. The instrument can be employed to detect errors and to afford guidance for correct usage. Coordination between hand movement and speech can be promoted, as can precision in the reading of a text and in its memorization. The translation of texts that have been set to music can be assisted by comparison of the rhythm of the translation against that of the original.

The instrument can also be employed for entertainment, in that one or more players can attempt to duplicate a rhythm selected from those available in the instrument, at a selected tempo. The instrument can be embodied on a scale for collective operation, through multiple keyboards and with a large display screen. The instrument can include additional functions of a kind conventionally available in computers.

Although the invention is exemplified below by an instrument adapted for dealing with the Arabic language, the instrument of the invention can be arranged to deal with any language, and any verse form. The invention is particularly suited to the treatment of other structured verse forms such as the English sonnet and the Welsh englyn and cywydd but is not limited to such forms.

For a better understanding of the present invention and to show how the same may be acarried into effect reference will now be made to the accompanying drawings, in which.

Figure 1:
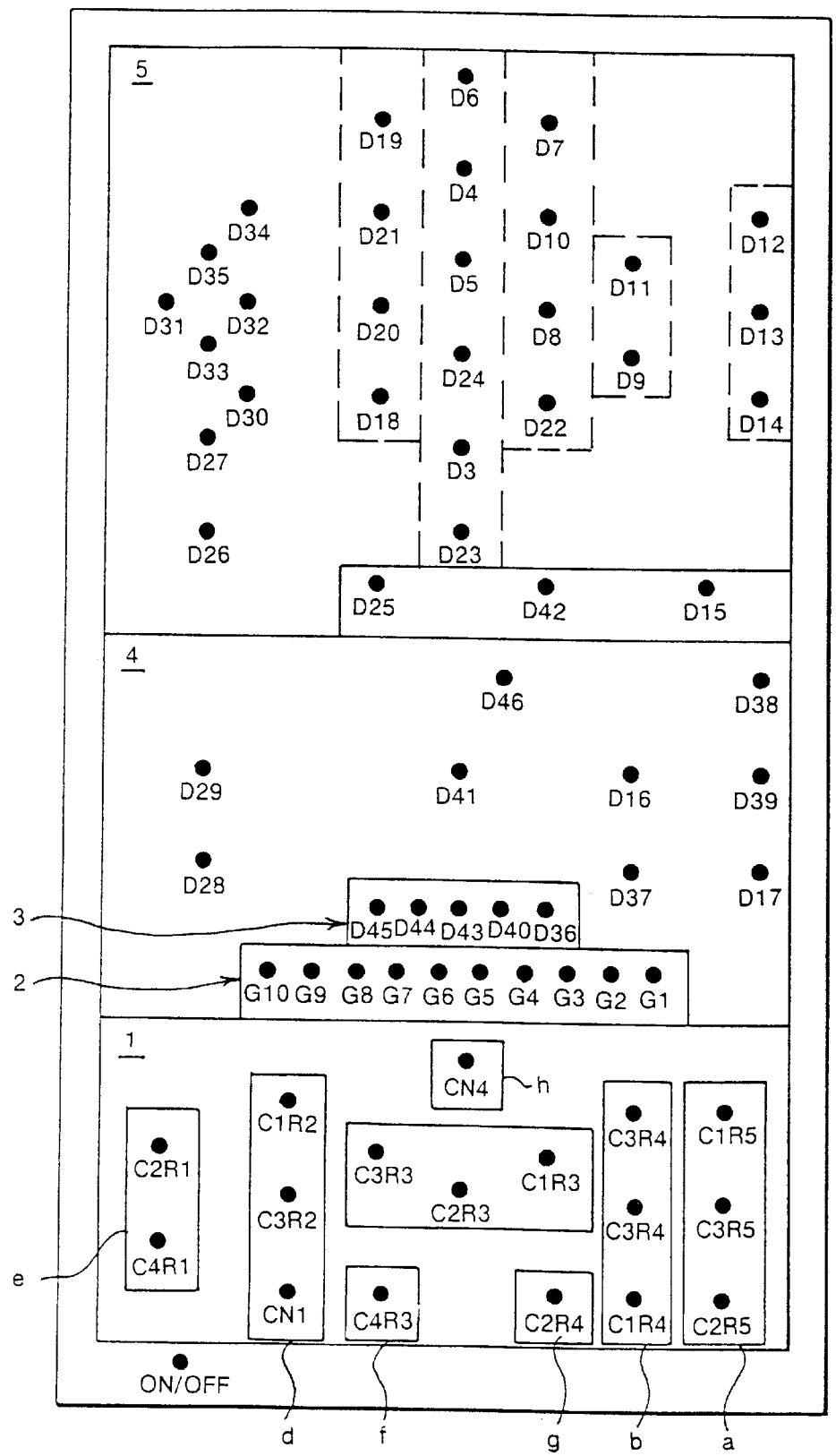
FIGS. 1–3 illustrate the arrangement of keys and lights on the front panel of an instrument according to the invention.

As shown in FIG. 1 the keys and lights are grouped according to function and purpose.

Figure 2:
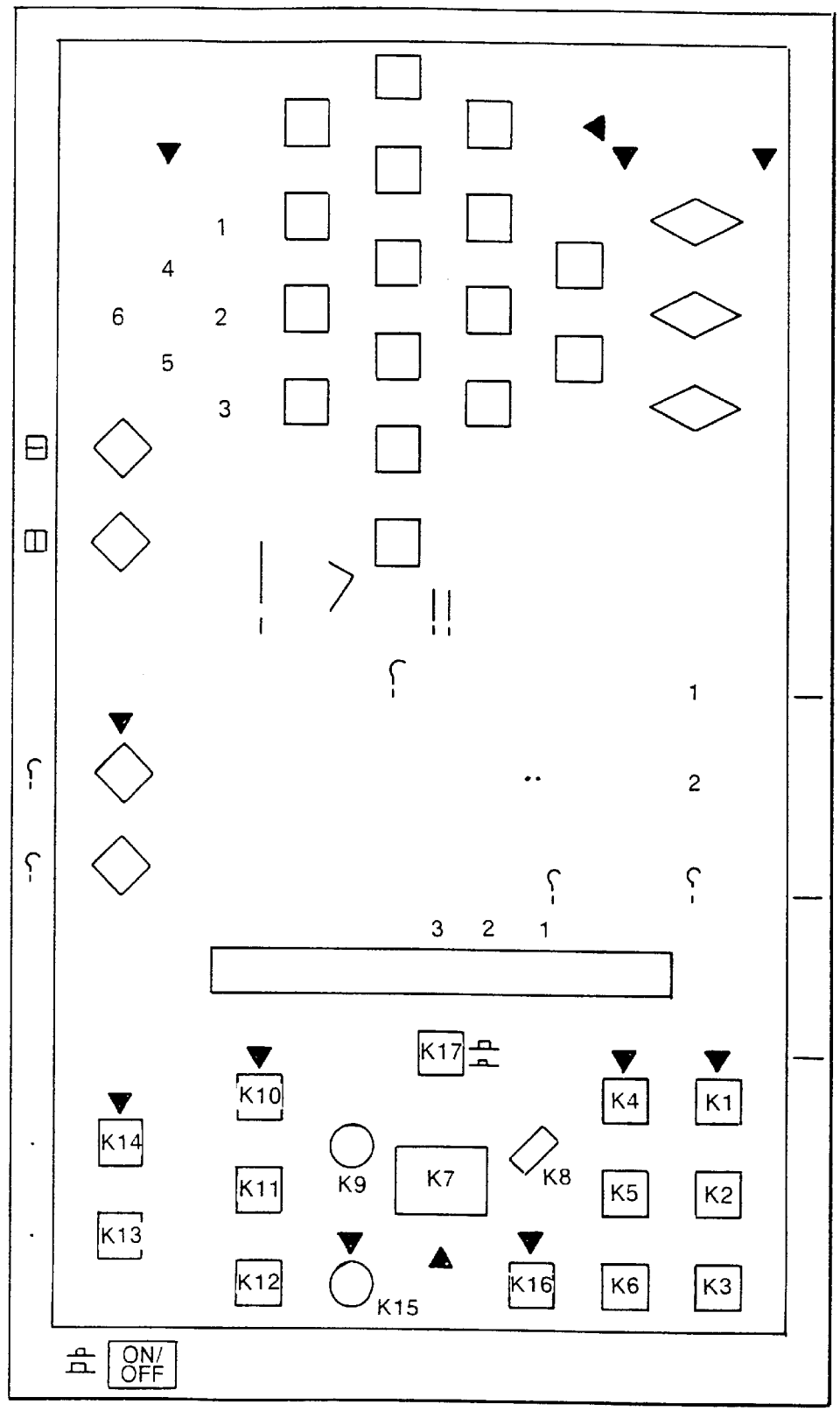
Figure 3:
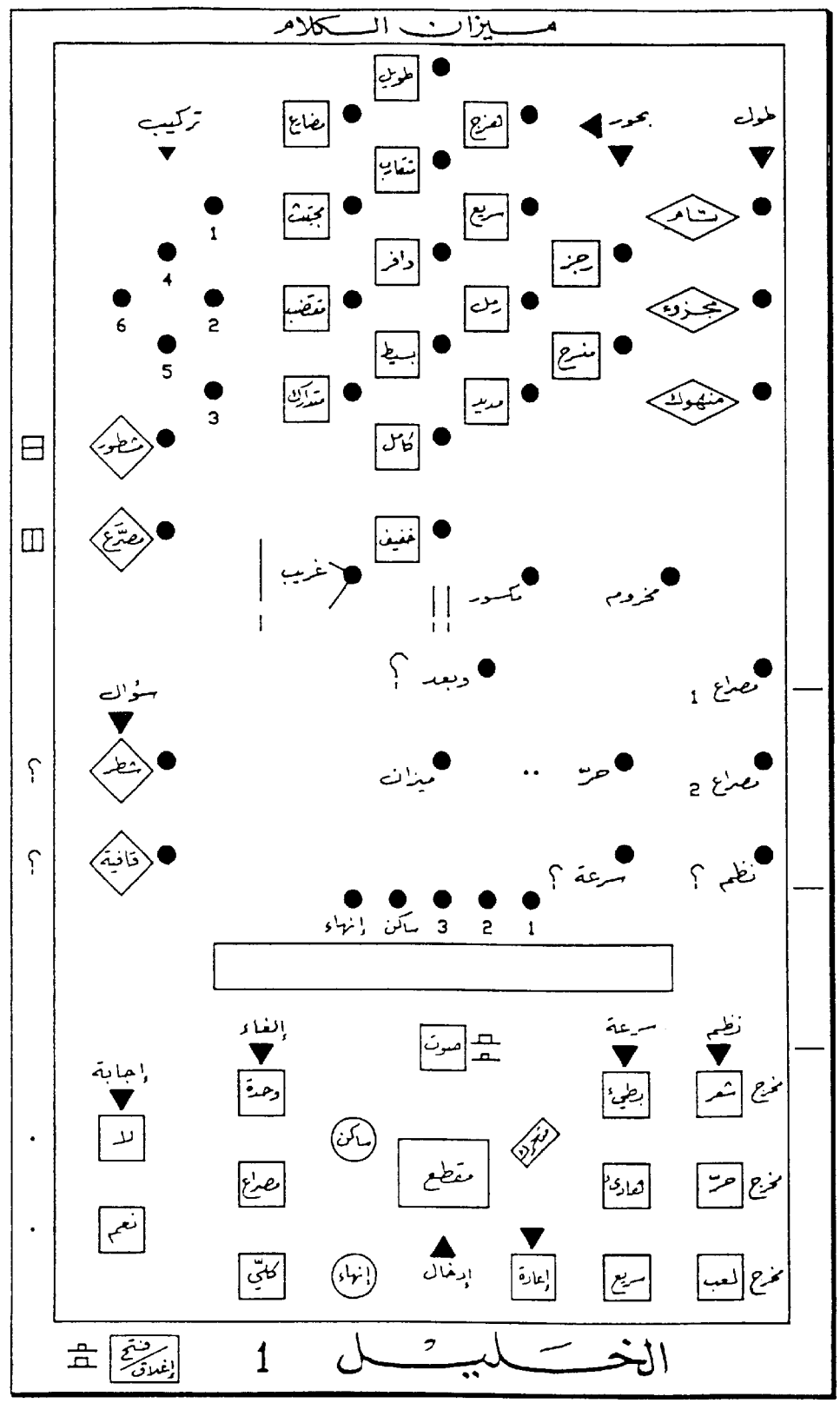
Figure 4A:
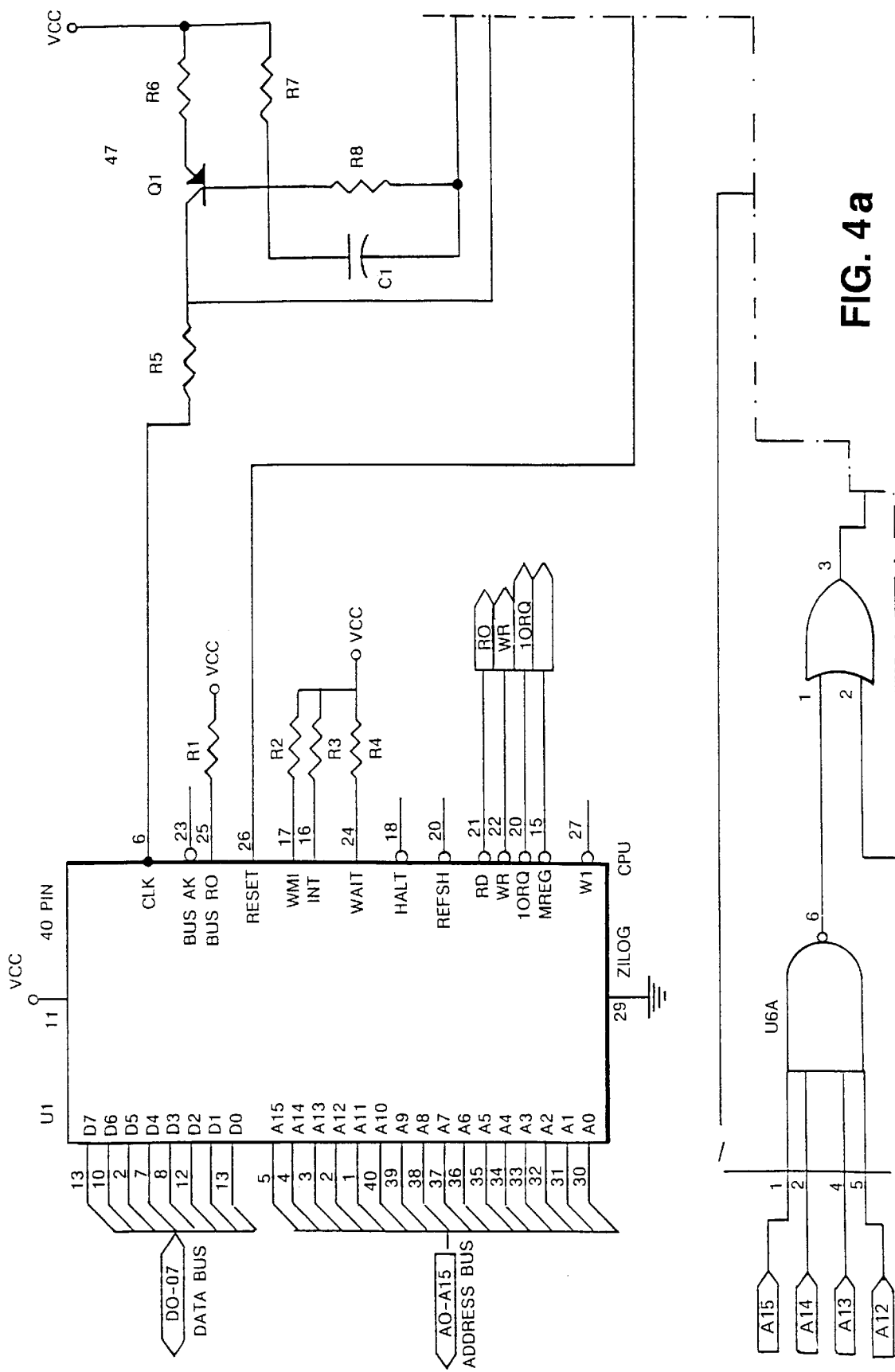
FIGS. 4–7 are circuit diagrams for an instrument according to the invention.
Figure 4B:
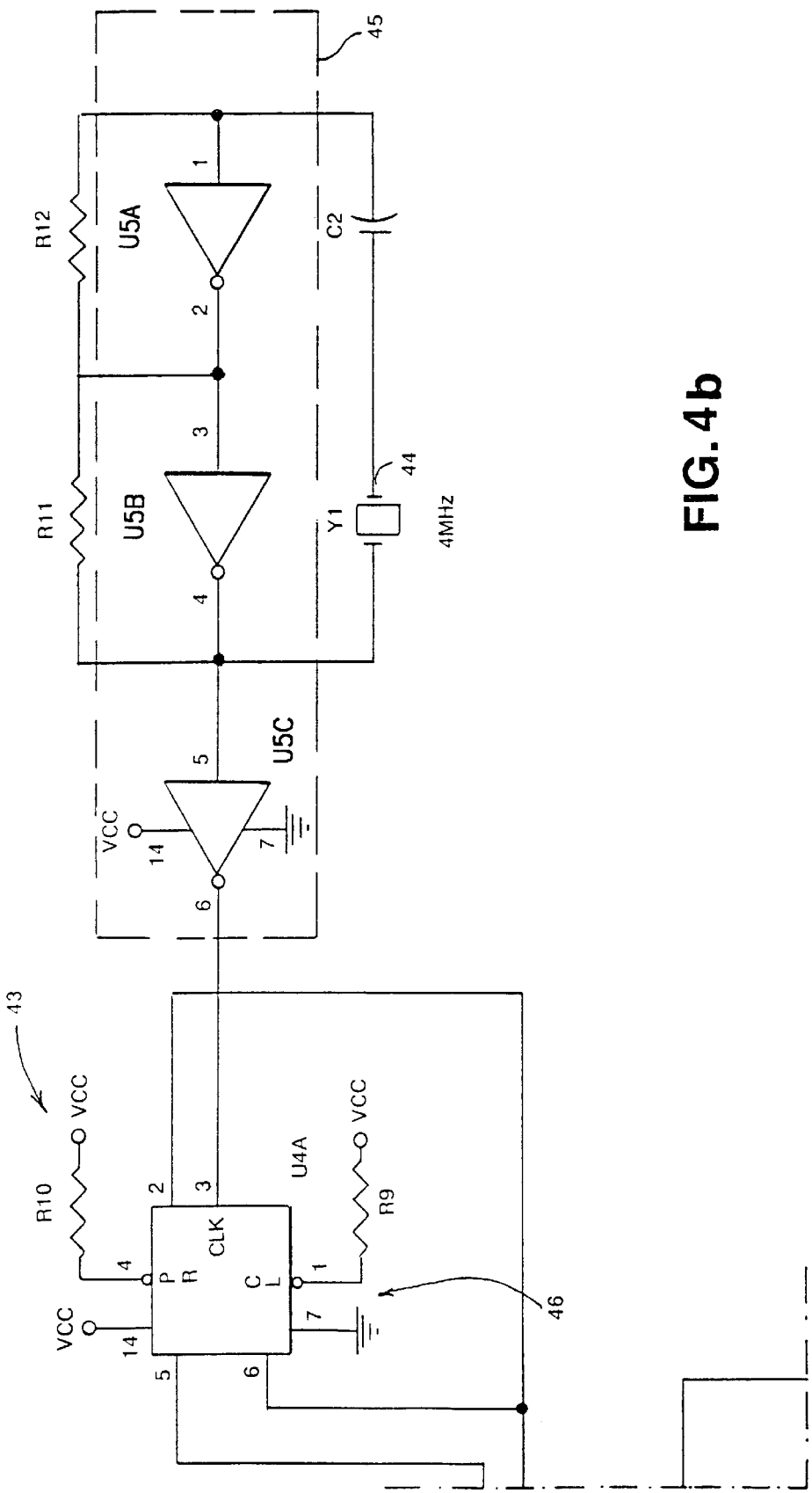
Figure 4C:
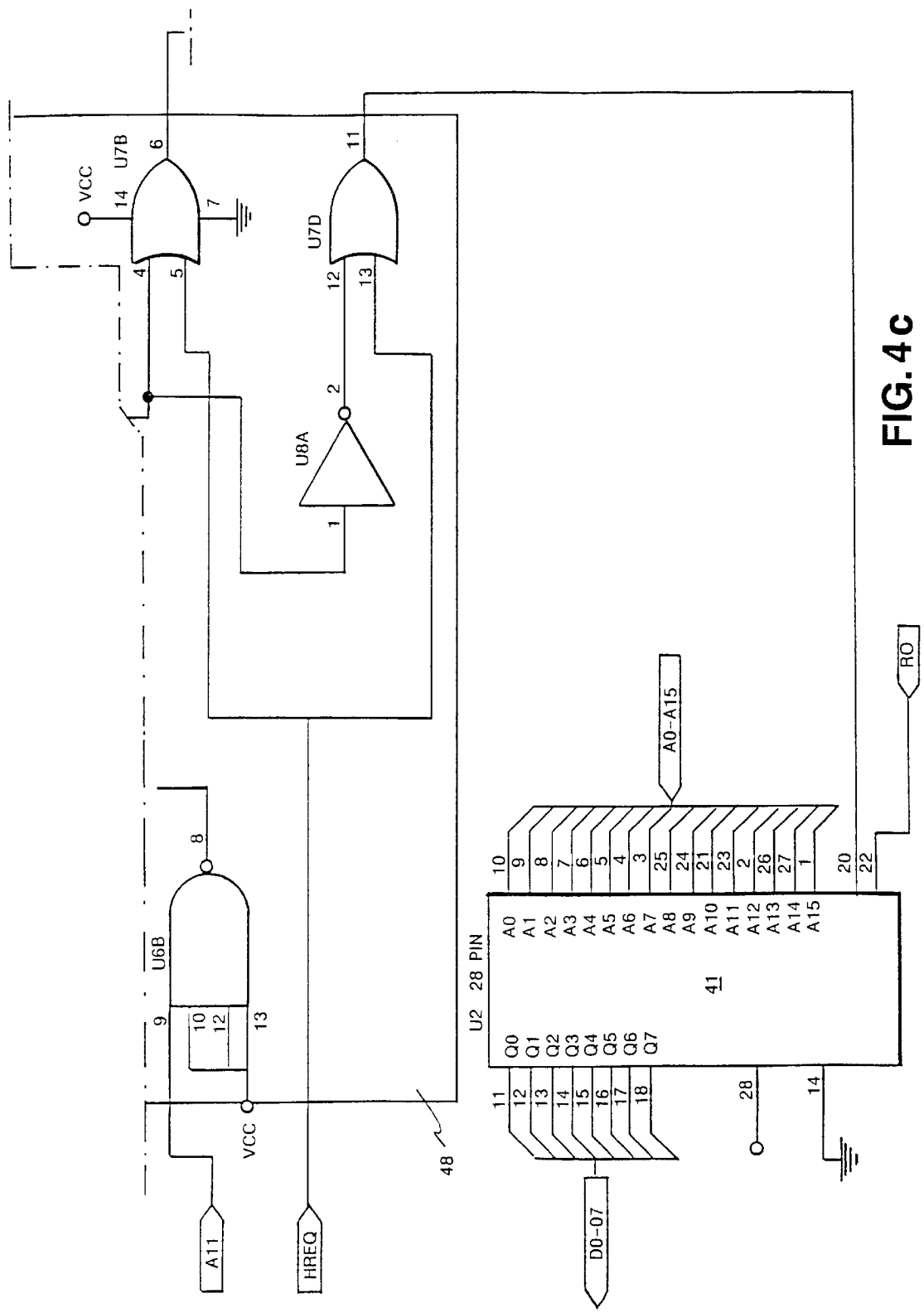
Figure 4D:
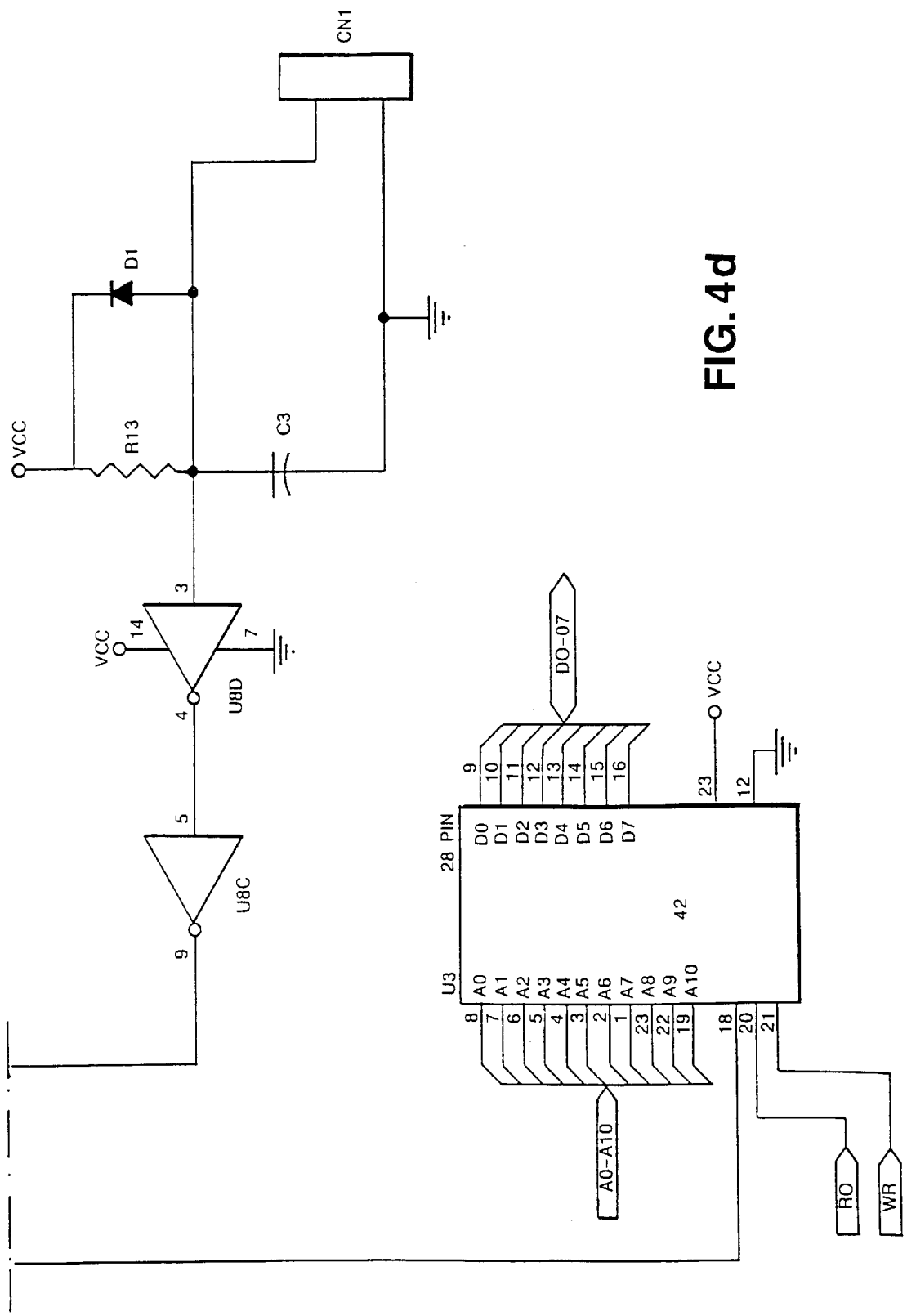

In the lower section of the front panel illustrated in FIGS. 1–3 is the keyboard section 1 with keys labeled K1 to K17 as marked in FIG. 2 for entering data and making appropriate selections of, for example, mode or tempo. The function of each of these keys is described below.

FIG. 1 illustrates the connection references of each of the keys and these connection references are indicated in parenthesis in the following list of functions of the keys. The keys arranged in groups according to their function and these groups are indicated by respective letters a–h.

a. Selection of mode
   Key 1 "Verse"(شعر)
   (C1R5) selection of verse/cancellation of entry but retraining option.
   Key 2 "Free"(حر)
   (C3R5) selection of prose or free types of Arabic verse or of verse in other languages/cancellation of entry but retaining option.
   Key 3 "Game"(لعب)
   (C2R5) selection of training and games/cancellation of entry but retaining option.
b. Selection of tempo
   Key 4 "Slow"(بطيء)
   (C4R4) selection of a slow tempo.
   Key 5 "Moderate"(هادئ)
   (C3R4) selection of a moderate tempo.
   Key 6 "Fast"(سريع)
   (C1R4) selection of a fast tempo.
c. Entering
   Key 7 "Maqta'"(مقطع)
   (C2R3) entering a maqta' or its substitute.
   Key 8 "Short Syllable"(متحرك)
   (C1R3) entering a short syllable at the end of a hemistich, line or unit.
   Key 9 "Consonant"(ساكن)
   (C3R3) entering a consonant at the end of a hemistich of line.
d. Cancelling
   Key 10 "Unit"(وحدة)
   (C1R2) cancelling units entered, one by one.
   Key 11 "Hemistich"(مصراع)
   (C3R2) cancelling one or two hemistichs one after the other.
   Key 12 "Total"(كلي)
   (CN1) cancelling of all data entered and returning to pre-selection mode.
e. Response
   Key 13 "Yes"(نعم)
   (C4R1) responding yes to the questions: rhythm ? hemistich?
   Key 14 "No"(لا)
   (C2R1) responding no to the questions: rhythm ? hemistich?
f. Ending
   Key 15 "Ending"(انتهاء)
   (C4R3) ending of hemistich, line or unit.
g. Returning
   Key 16 "No"(اعادة)
   (C2R4) returning an entry, after ending.
h. Sound
   Key 17 "No"(صوت)
   (CN4) with our without a sound.

A power switch "on/off" is located in the lower lefthand corner of the panel.

A display section 2 consists of ten 7-segment LEDs. These are used to display the result of entering data on keys K7, K8 and K9 (Section C). The panel illustrated is arranged to be particularly convenient to an Arabic speaker and hence to someone more familiar with reading from right to left than from left to right.

The 7-segment LED displays marked G1–G10 in FIG. 1 indicates the entered data by displaying any one of the numbers 1–4 or a hyphen either at the top of the display or the bottom of the display depending on the data entered. 1 corresponds to a unitary maqta'. 2 corresponds to a binary maqta'. 3 to a tertiary maqta' and 4 to a quaternary maqta'. The upper hyphen "-" corresponds to a short syllable appended to a prior maqta' at the end of a hemistich line or unit. However a hyphen at the bottom of the display "_" corresponds to a consonant appended to a prior maqta' at the end of a hemistich line or unit.

The select section 3 of FIG. 1 consists of five lights which are preferably LEDs and which are used to indicate the options available when first entering the data:
   Light 1 (D36) indicates the option of a unitary maqta'
   Light 2 (D40) indicates the option of a binary maqta'
   Light 3 (D43) indicates option of a tertiary maqta'
   Light 4 (D44) indicates option of a consonant
   Light 5 (D45) indicates the option of ending.

The signals and questions section 4 of FIG. 1 comprises nine lights, preferably LEDs, which serve the following purposes:
   Light 6 (D17) poses the question of mode:verse, free, game?
   Light 7 (D37) poses the question about the tempo required.
   Light 8 (D38) a signal of readiness for entering the first hemistich.
   Light 9 (D39) a signal of readiness for entering the second hemistich.
   Light 10 (D16) a signal of readiness for entering prose, or free kinds of verse or any other beat outside speech.
   Light 11 (D46) indicates that the entry is not sufficient or is incomplete.
   Light 12 (D28) asks about the presence of rhyme at the end of the first hemistich.
   Light 13 (D29) asks whether the verse is composed of one hemistich only.
   Light 14 (D41) analyses entering by a flashing light.

The results section indicated at 5 in FIG. 1 comprises three LEDs D12, D13, & D14 to the top right of the front panel. These indicate whether or not the line of verse is complete. D12 indicates that the line of verse is complete whereas D13 indicates that the line of verse lacks a third and D14 indicates that the line of verse lacks two-thirds.

The upper middle section of the panel comprises lights indicating the meters: the ancient meters comprise the two lights D9 & D11 belonging to the second beat group illustrating the two elementary meters. The other ancient meters are illustrated by the lights D7 of the first group, D10 of the second group, and D8 & D22 of the second group.

The exemplary classical meters comprise D6, D4, D5 of the first group, D24 and D3 of the second group and D23 of the third group. The post classical meters are illustrated by lights D19 of the first group, D21 of the second group and D20 & D18 of the third group.

The section to the upper left area of the panel comprises a set of lights indicating the combinations of the first and second hemistich in the same line of verse and in the poem. D34 indicates the first combination, D32 indicates the second combination, D30 indicates the third, D35 indicates the fourth, D33 indicates the fifth and D31 indicates the sixth combination. In addition D27 indicates that the verse is of the hemistich kind and D26 indicates the (exceptional) case when two hemistiches are identical as regards their measure because the same rhyme is present in the first and second hemistich.

The correctness of the composition is indicated by the light D15 which indicates that the first hemistich of a verse whose meter belongs to the first beat group lacks a short syllable at its beginning. D25 indicates that the maqta' or hemistich is of a rare type or is a theoretical construct (?) of classical prosody (?). D42 indicates the presence of a fracture.

FIGS. 4–7 show the electronic circuit design of the hardware wires behind the front panel of FIGS. 1–3.

FIG. 4 illustrates the microprocessor and memory circuit. The microprocessor 40 is the Z80 CPU to which 64K of EPROM 41 and 2K of static RAM 42 is connected. In this particular embodiment only 62K of the EPROM is used. The static RAM 42 is used to store the various system variables. The microprocessor 40 runs at 2 MHz provided by a clock circuitry shown at 43 in FIG. 4. A 4 MHz crystal 44 is connected as shown to inverters U5A. U5B, and U5C which are taken from an integrated circuit 45 such as the 74LS04 with appropriate resistors R11 & R12 (both 680 ohms) and a capacitor C2 of 6 pF/25V. The output of the inverter U5C is connected to the input of a divider formed by D-type flipflop 46 which is taken from integrated circuit 74LS74. An amplifier circuit is used to drive the clock signal to the CPU. The resulting 2 MHz clock pulse is fed to the cock input of the Z80 microprocessor 40.

The reset terminal of the microprocessor 40 is connected via schmitt trigger U8B & C, from integrated circuit 74LS14, connected as illustrated with a 10K resistor R13 and a capacitor C3 (100 uF/16V) and a diode D1 (1N4001) to connector CN1 in FIG. 1 corresponding to key 12 in FIG. 2 which is used as a reset for cancelling all data entered.

The data on data bus lines D0–D7 is fed into and out of the data terminal of microprocessor 40 and the address data bus is fed out from microprocessor 40 on the address bus identified in FIG. 4. The higher address lines A11 to A15 are used, via the logic circuitry indicated at 48 in FIG. 4, to select either SRAM memory 42 or EPROM memory via the chip select (CE) terminals of each. The memory request (MREQ) output of the microprocessor 40 is also used to address the two memory circuits 41 & 42. Address lines A0–A10 are used to address the data on the SRAM memory 42 whereas address lines A0–A15 are used to address the memory cells of the EPROM 41.

Figure 5A:
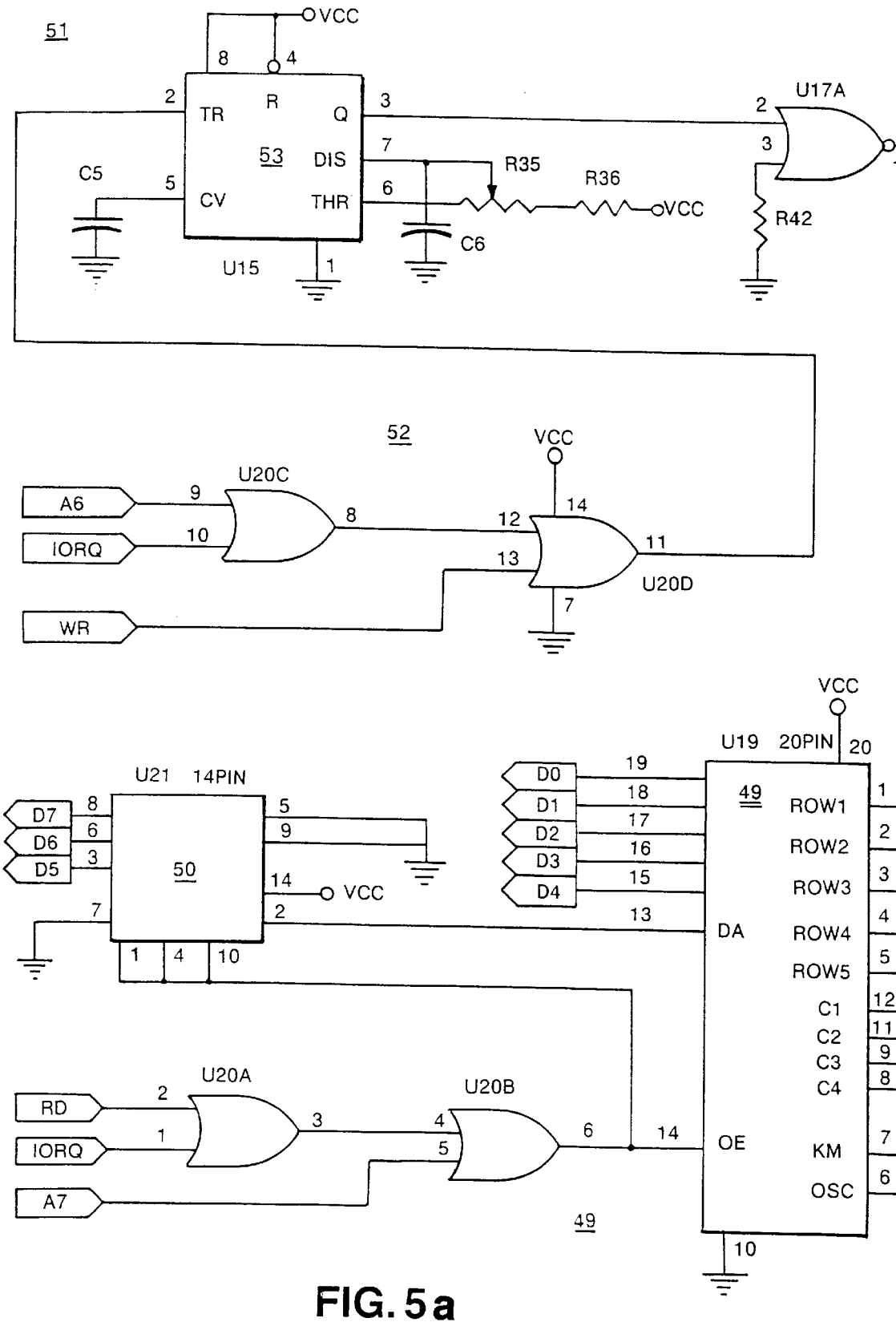
Figure 5B:
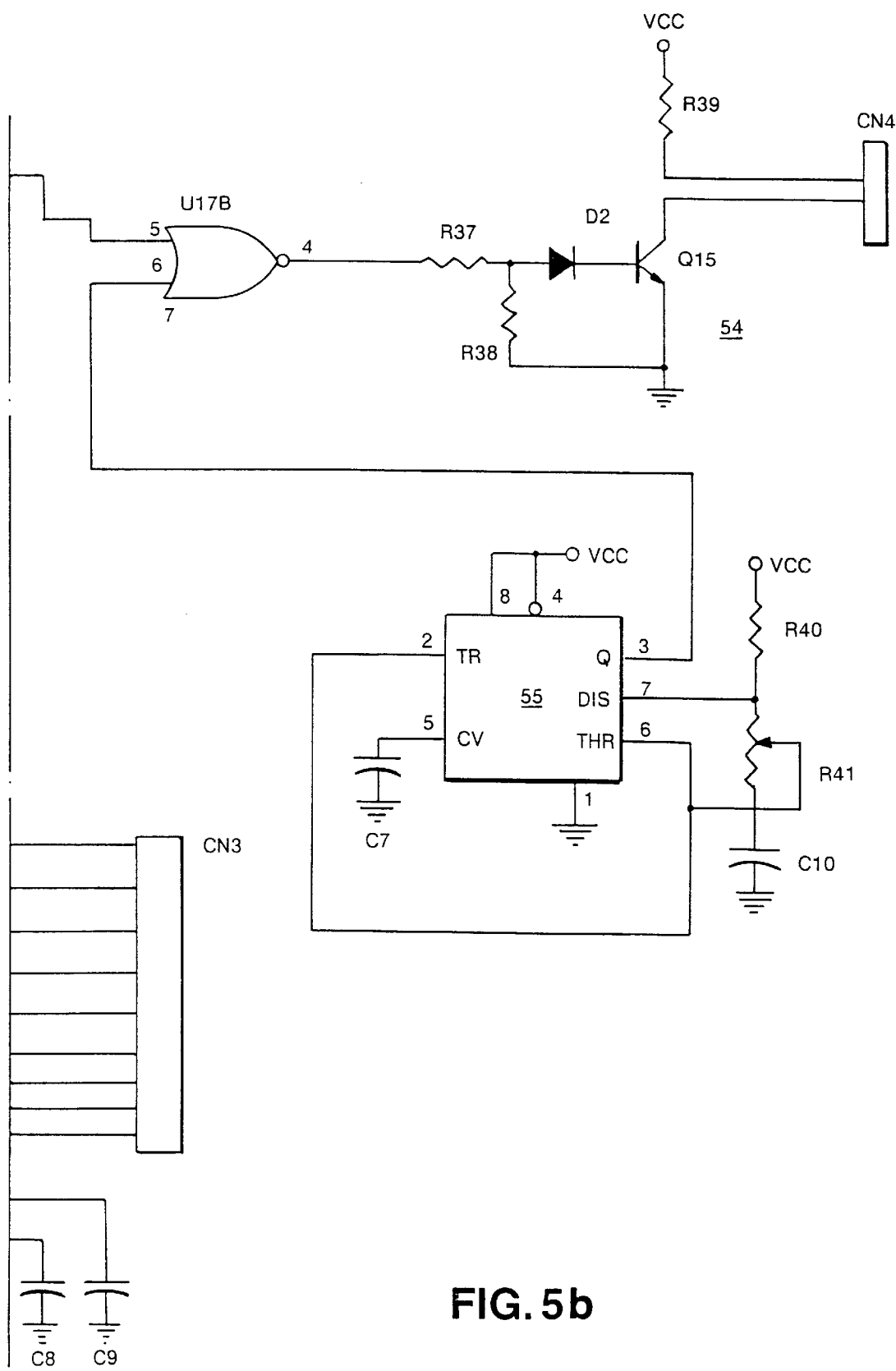

FIG. 5 shows the keyboard controller circuitry (1 in FIG. 1). Connector CN3 is connected to the keyboard 1 which is 5×4 matrix keyboard comprising the seventeen keys K1–K17 (FIG. 2). A standard keyboard decoder 49, which is typically integrated circuit 74C923, scans the matrix keyboard and identifies the keys pressed by the unique combination of signals at one of the "row" inputs ROW1–ROW5, and the column terminals C1–C4. The key pressed is then identified by the code on data lines D0–D4. The other connections to the keyboard decoder 49 are standard connections with the read RD and input/output request IORQ serving to select the keyboard decoder via terminal OE on the decoder 49. Data outputs D5–D7 from the keyboard decoder 49 are generated via integrated circuit output DA via a buffer circuit 50 which is typically integrated circuit 74LS125.

FIG. 5 also shows the tone generator circuitry which is preferably built into the instrument. The circuit for this is indicated generally at 51 in the upper half of FIG. 5. The input-output request IORQ and the write WR output from the microprocessor 40 (FIG. 4) together with address line A6 are passed through decoder 52 comprising two OR gates connected as shown in FIG. 5. These OR gates U20C & U20D are from integrated circuit 74LS32. The output of this decoder 52 forms the input of a multivibrator 53 which drives a speaker (not shown) via amplifier 54 and connection CN4. The tone duration is controlled by variable resistor R35 (100K) whereas the frequency of the tone, i.e., the pitch, is controlled by variable resistor R41 (10K) connected to a one-shot monostable 55. The multivibrator 53 and the one-shot 55 may typically each be integrated circuit LM555. The amplifier 54 is typically a 2N2222.

The connector CN1 (FIG. 4) is a push button reset switch on the front panel (see FIG. 1), and is indicated in FIG. 2 by key K12.

Connector CN4 is also a push button switch as illustrated in FIG. 3 and is identified on FIG. 2 as key 17. This switch controls whether the speaker is turned on or off.

Figure 6A:
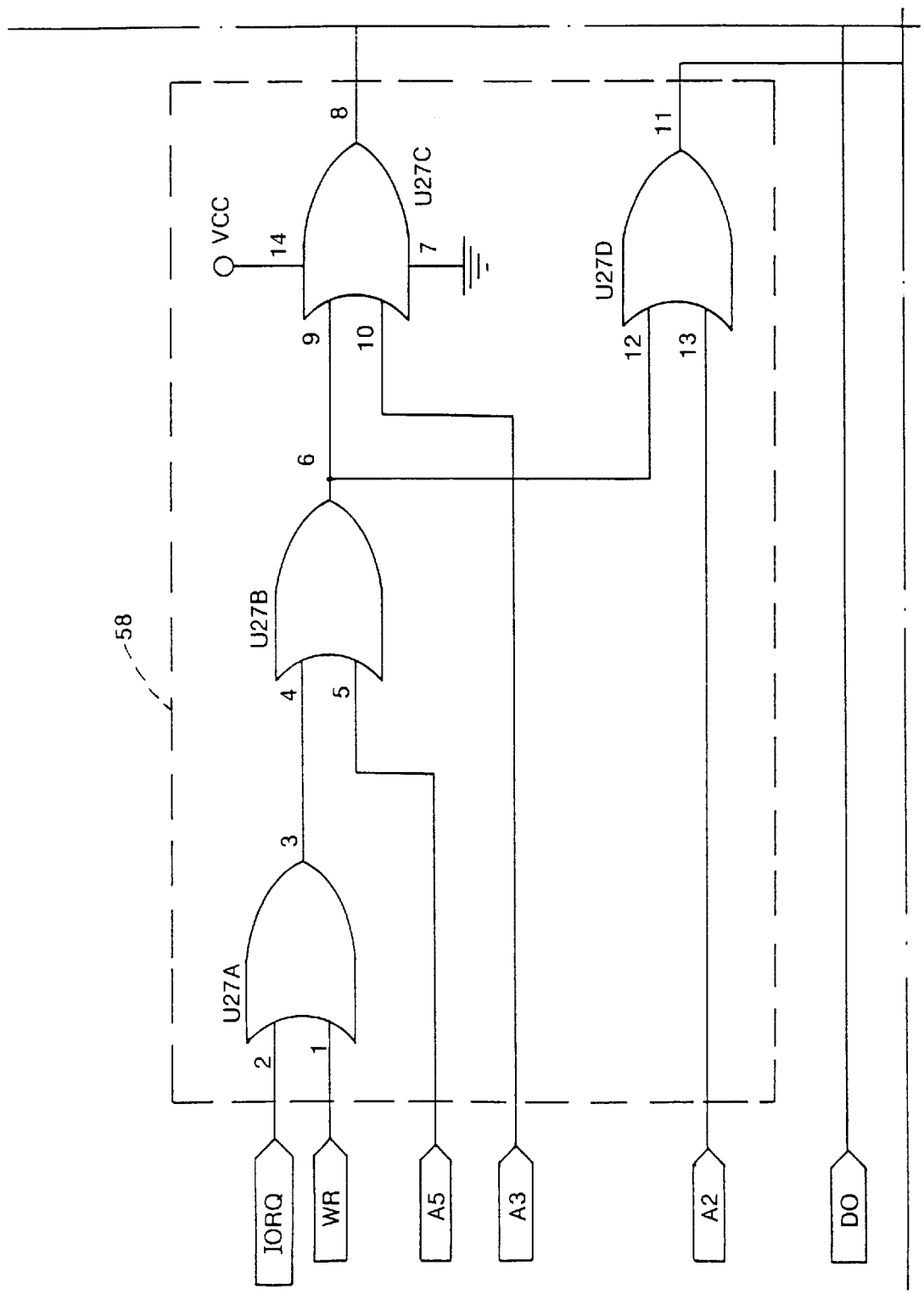
Figure 6B:
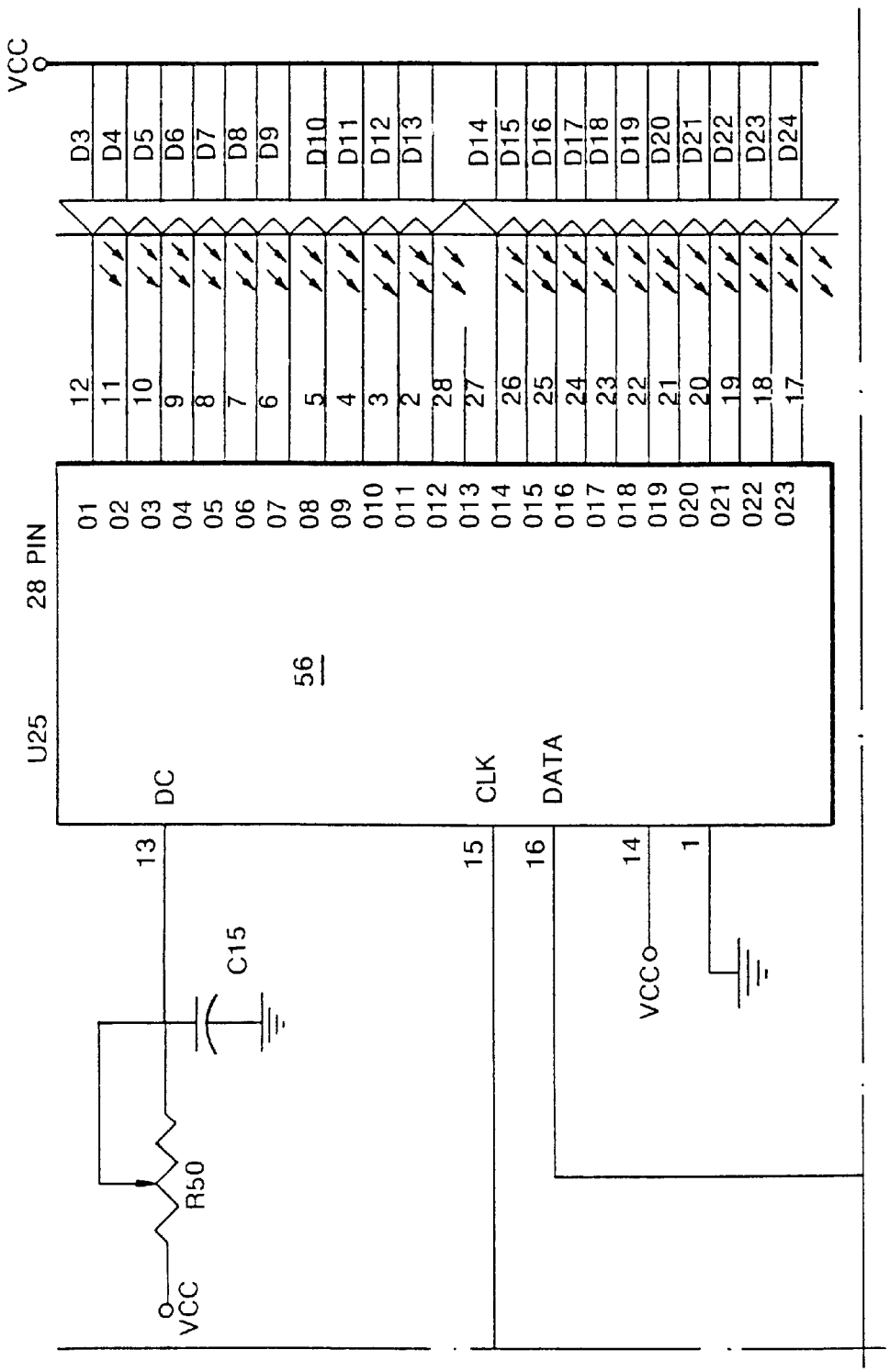
Figure 6C:
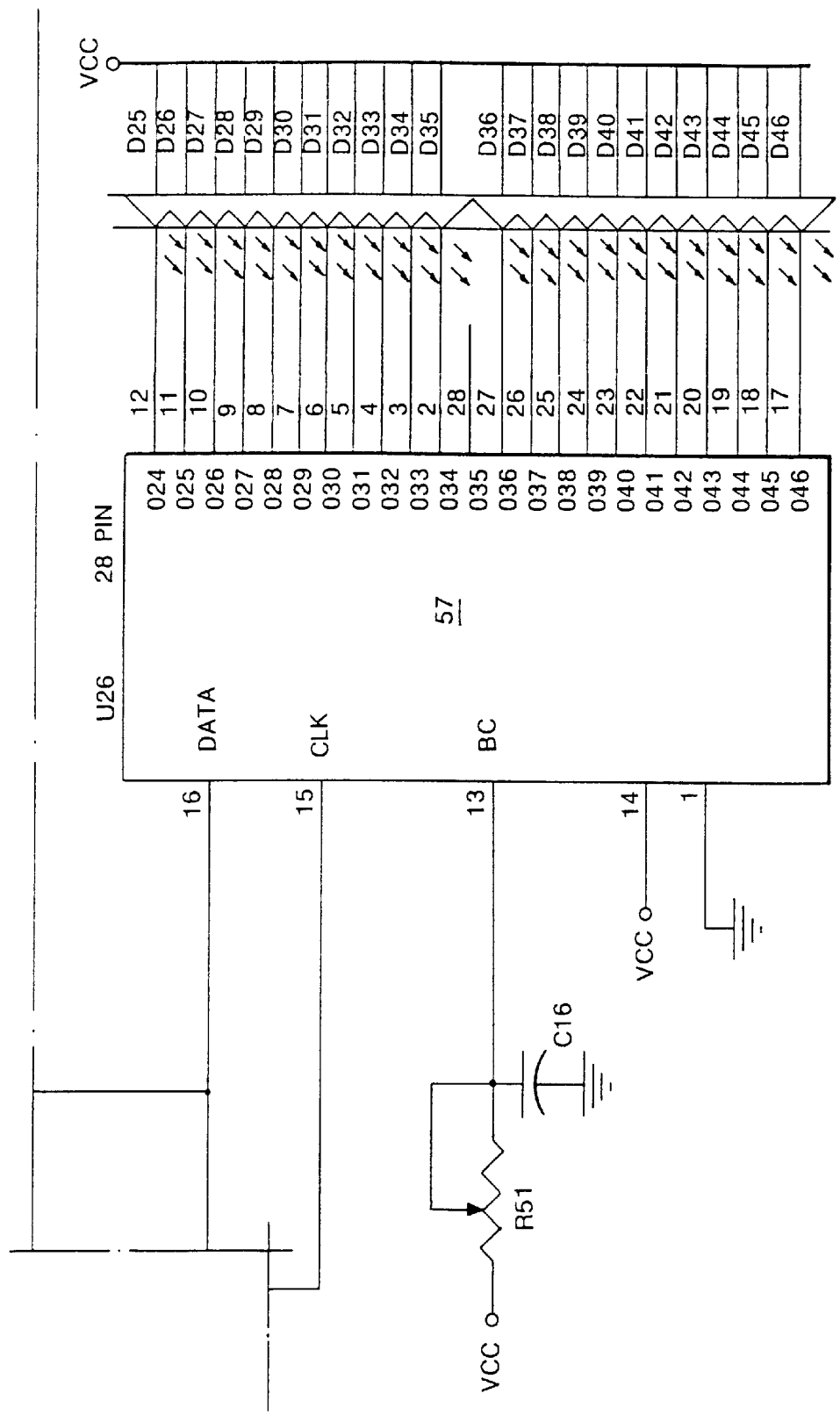

FIG. 6 illustrates the LED (light emitting diode) controllers and their related circuitry. The LEDs (D3–D46) are preferably 3 mm high efficiency low current LEDs with a typical If=2 mA. Two LED display controllers 56 & 57 are typically integrated circuits MM5480 connected as shown. Two circuits with respective 100K potentiometers R50 & R51 connected as shown to respective capacitors C15 & C16 rated at 0.001 uF/16 V are provided for controlling the brightness of LEDs. A decoder 58, typically integrated circuit 74LS32 is used to supply clock pulses to the two display controllers 56 & 57. The data line DATA for the decoders 56 & 57 is supplied via terminals 16 from line DO of the microprocessor data bus.

Figure 7A:
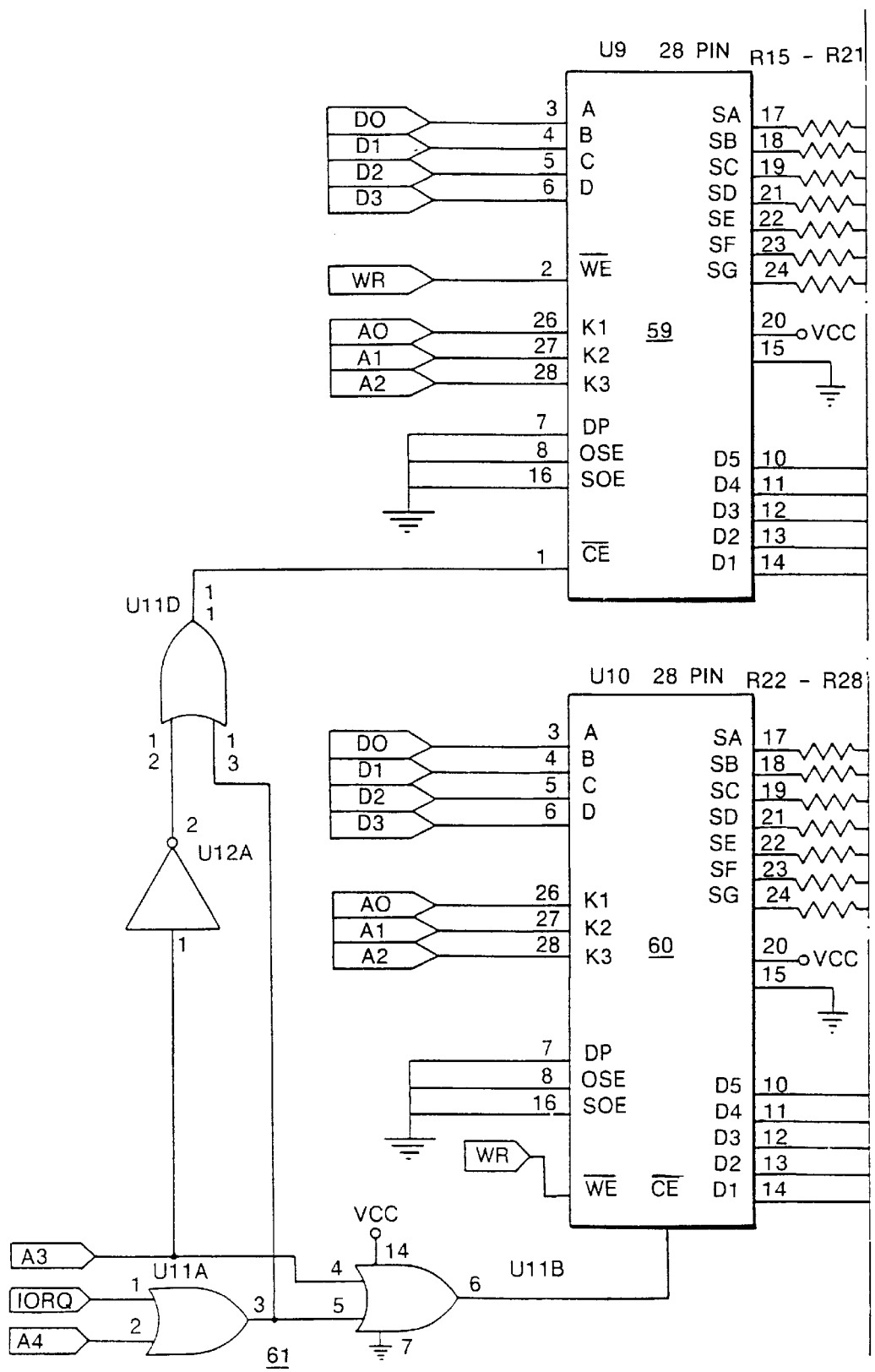
Figure 7B:
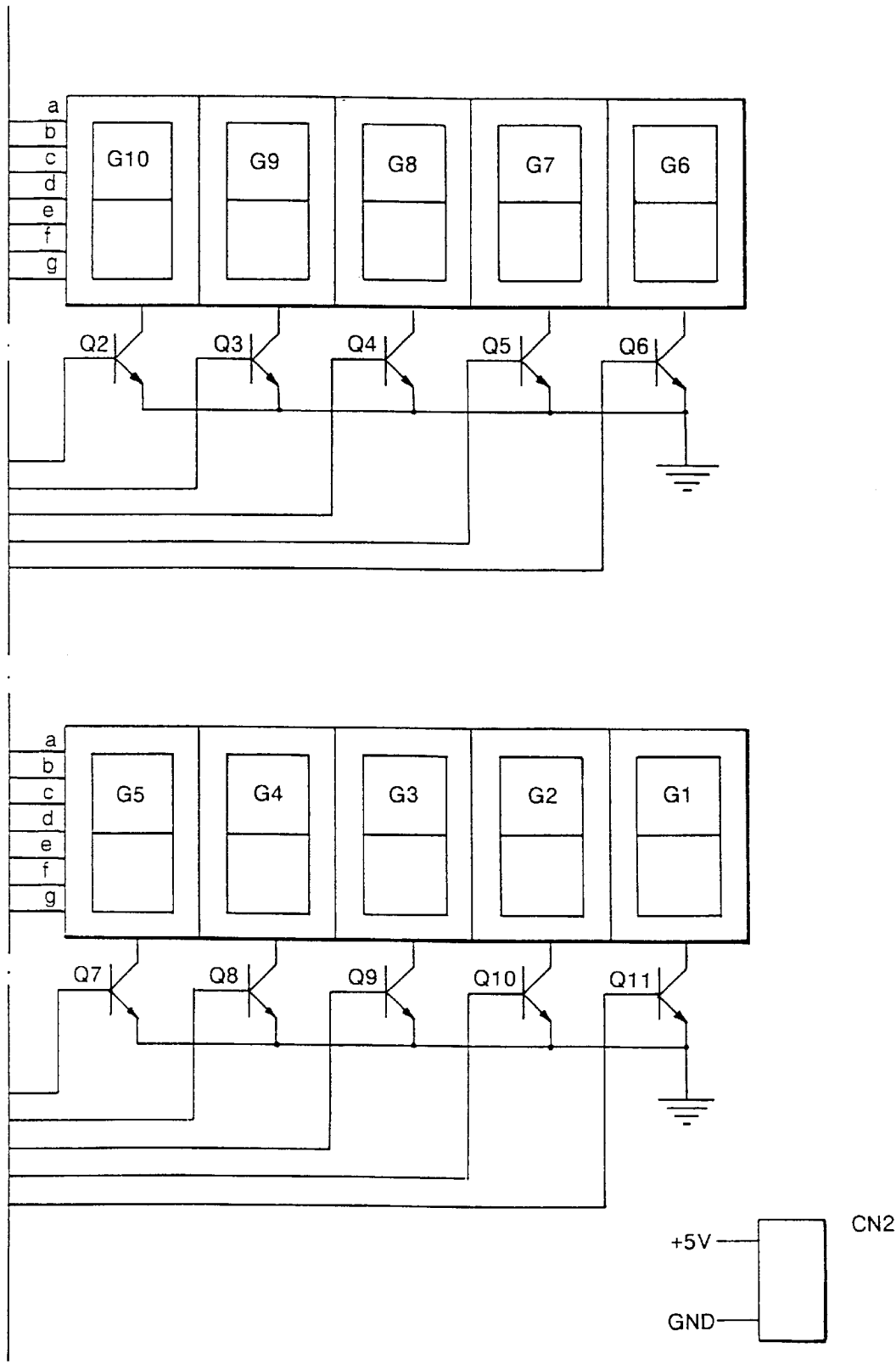

FIG. 7 illustrates a 7-segment display controller for controlling the display 2 (see FIG. 1), i.e. for controlling the set of 7-segment LEDs identified at G1–G10.

Two 7-segment display controller drivers 59 & 60 are used each to drive 7-segment displays. These are typically the twenty-eight pin integrated circuit 74C912. Each is driven by data on data bus lines D0–D3 and the addresses A0–A2. The chip select CE terminal is driven by a decoding circuit 61 comprised of integrated circuits 74LS32 and 74LS04. The segments are driven via resistors R15–R28 typically of the value 30R. These resistors are used to limit the current through the LEDs.

Connector CN4 can be used to connect a speaker or a buzzer to the amplifier 54.

The switch CN2 (on/off) connects to the circuit either to power (5 volts) or to ground as illustrated in FIG. 7.

Another way of implementing the instrument is shown below

Figure 8:
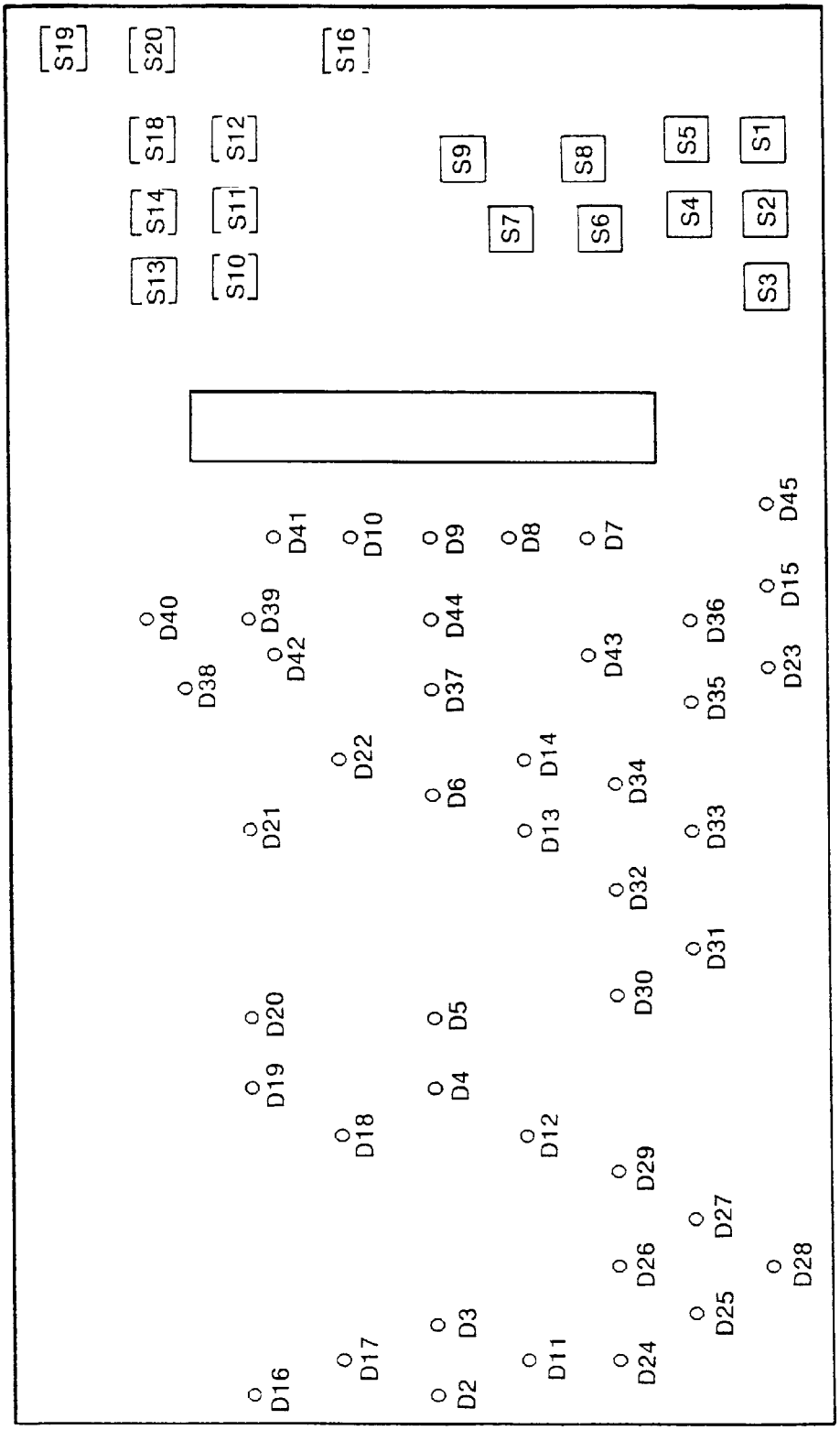
Figure 9:
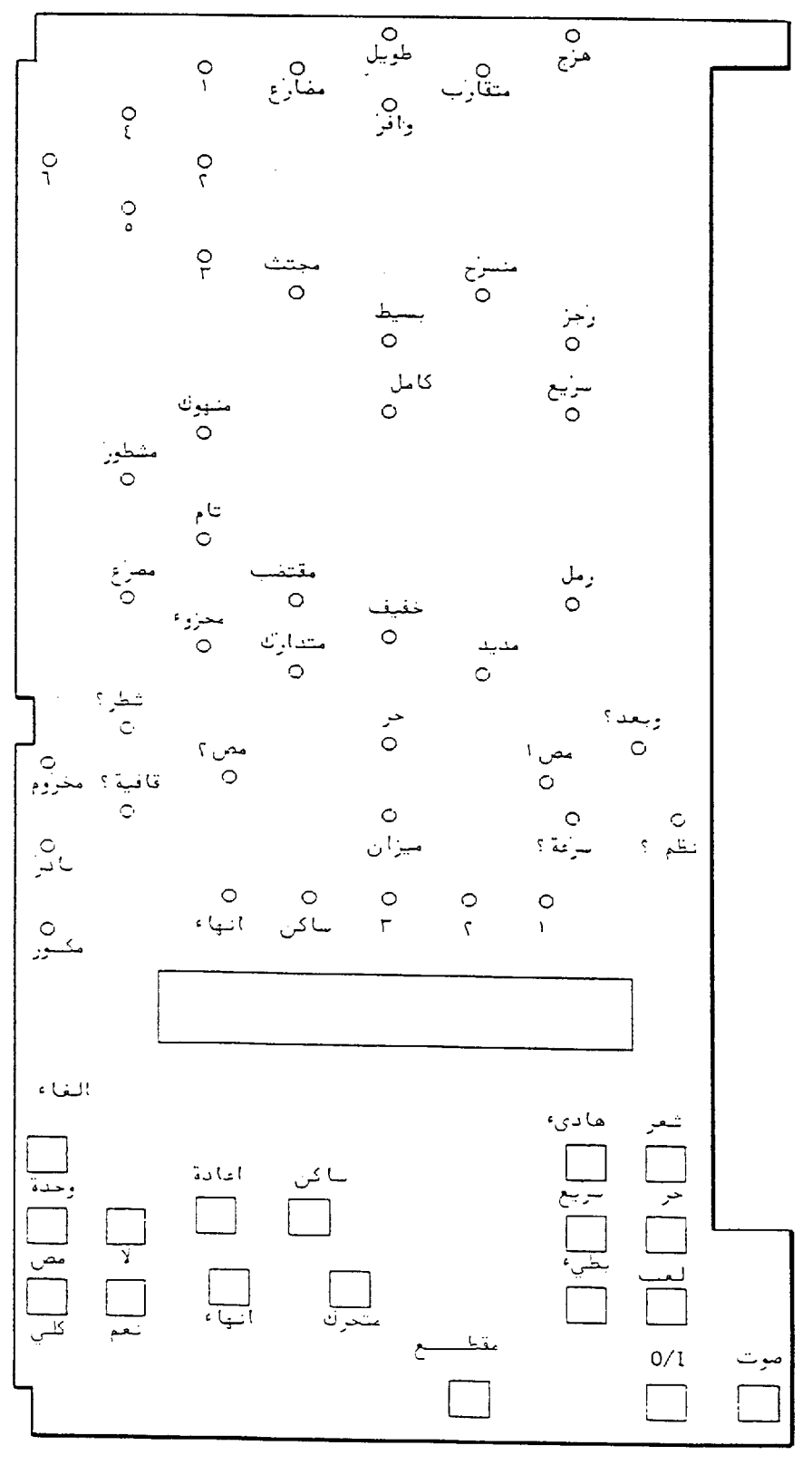
Figure 10:
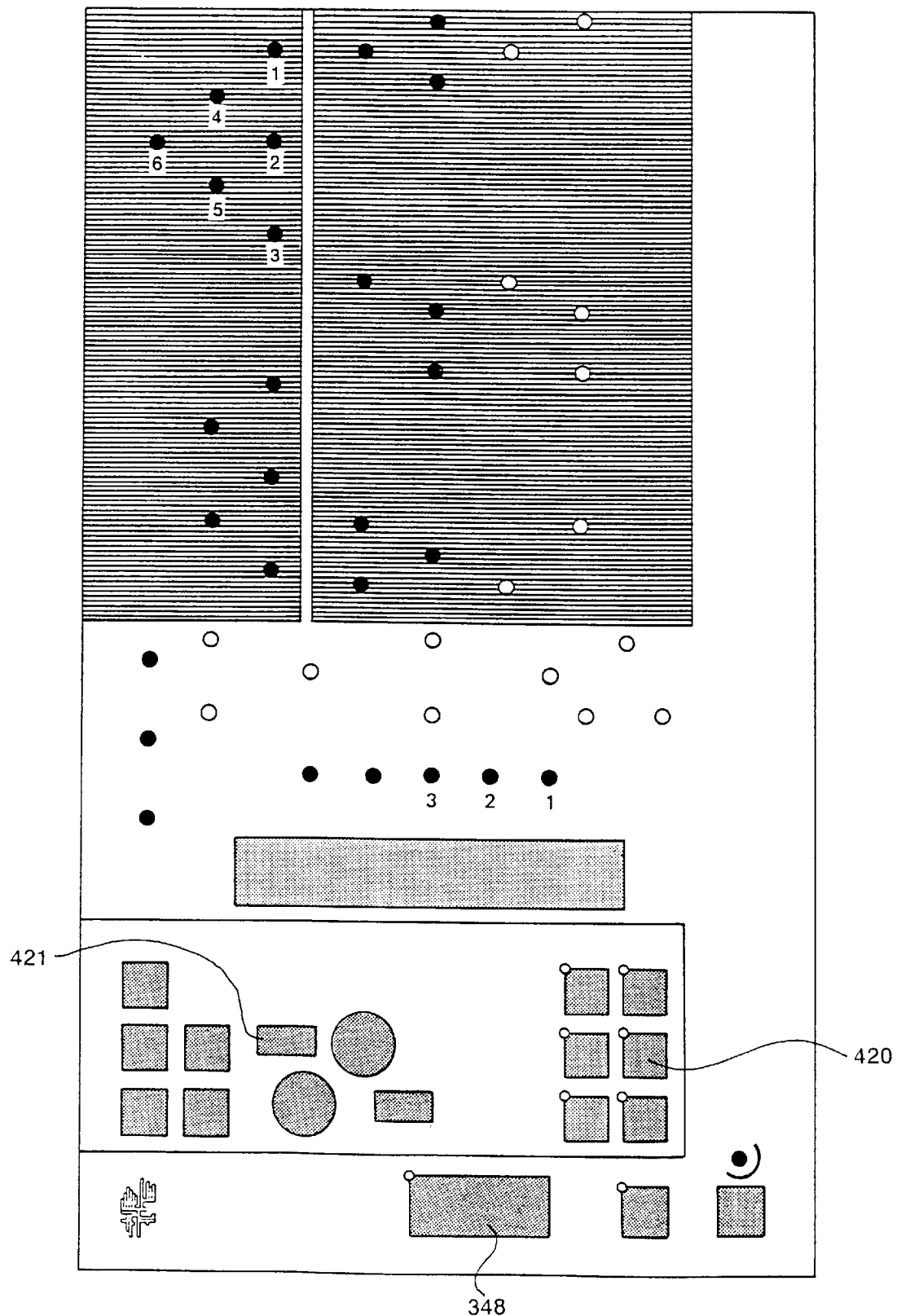
Figure 11A:
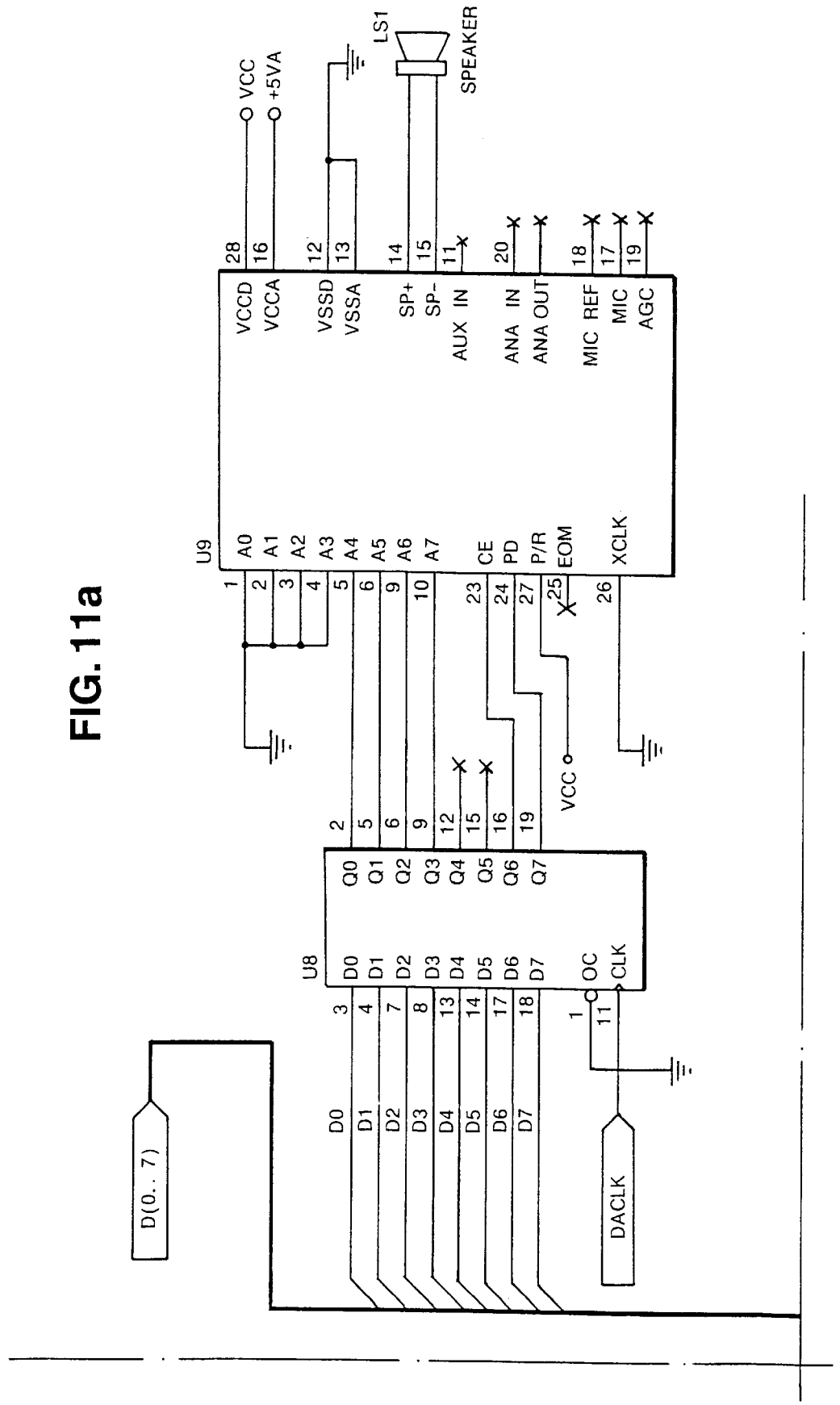
Figure 11B:
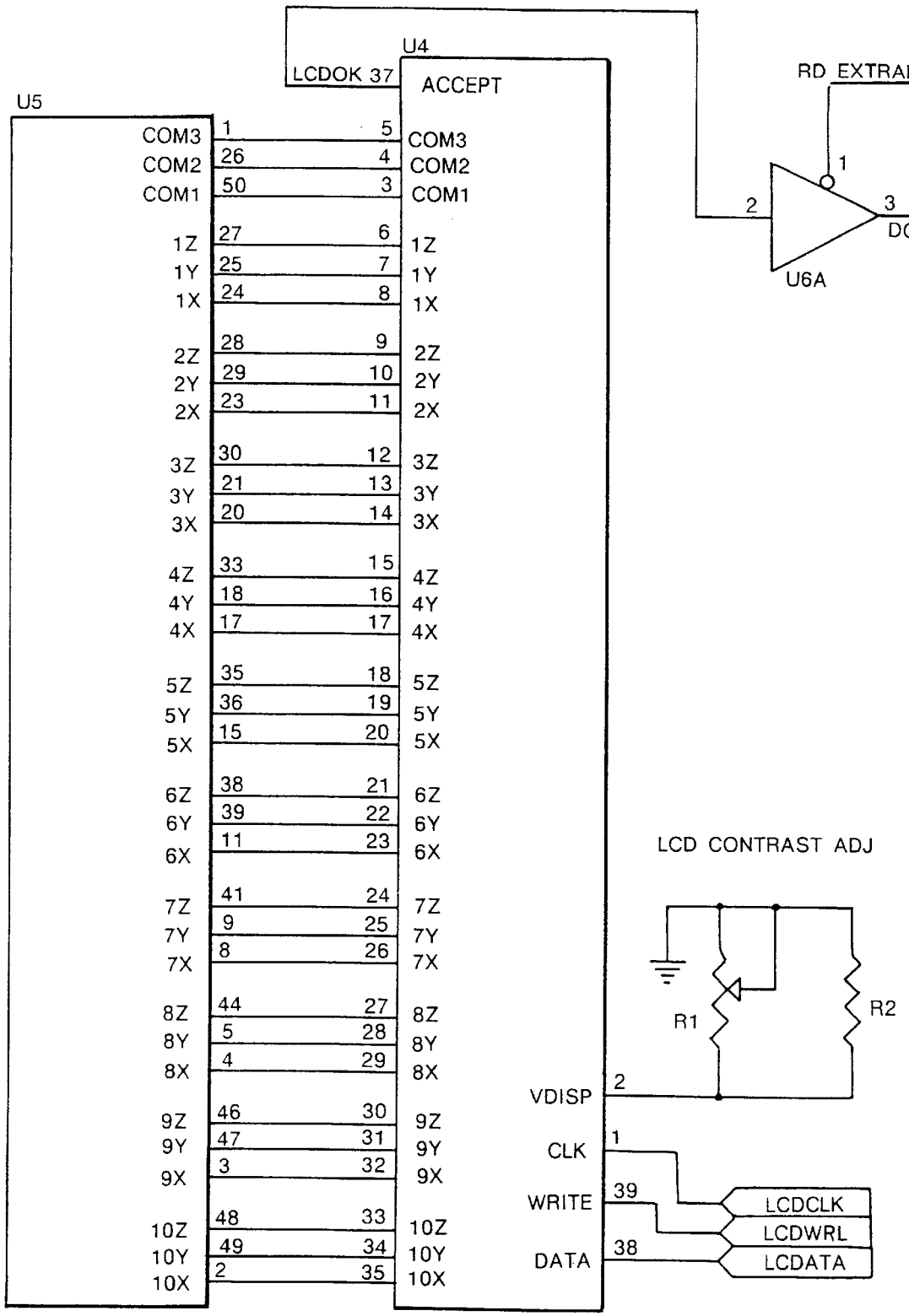
Figure 11C:
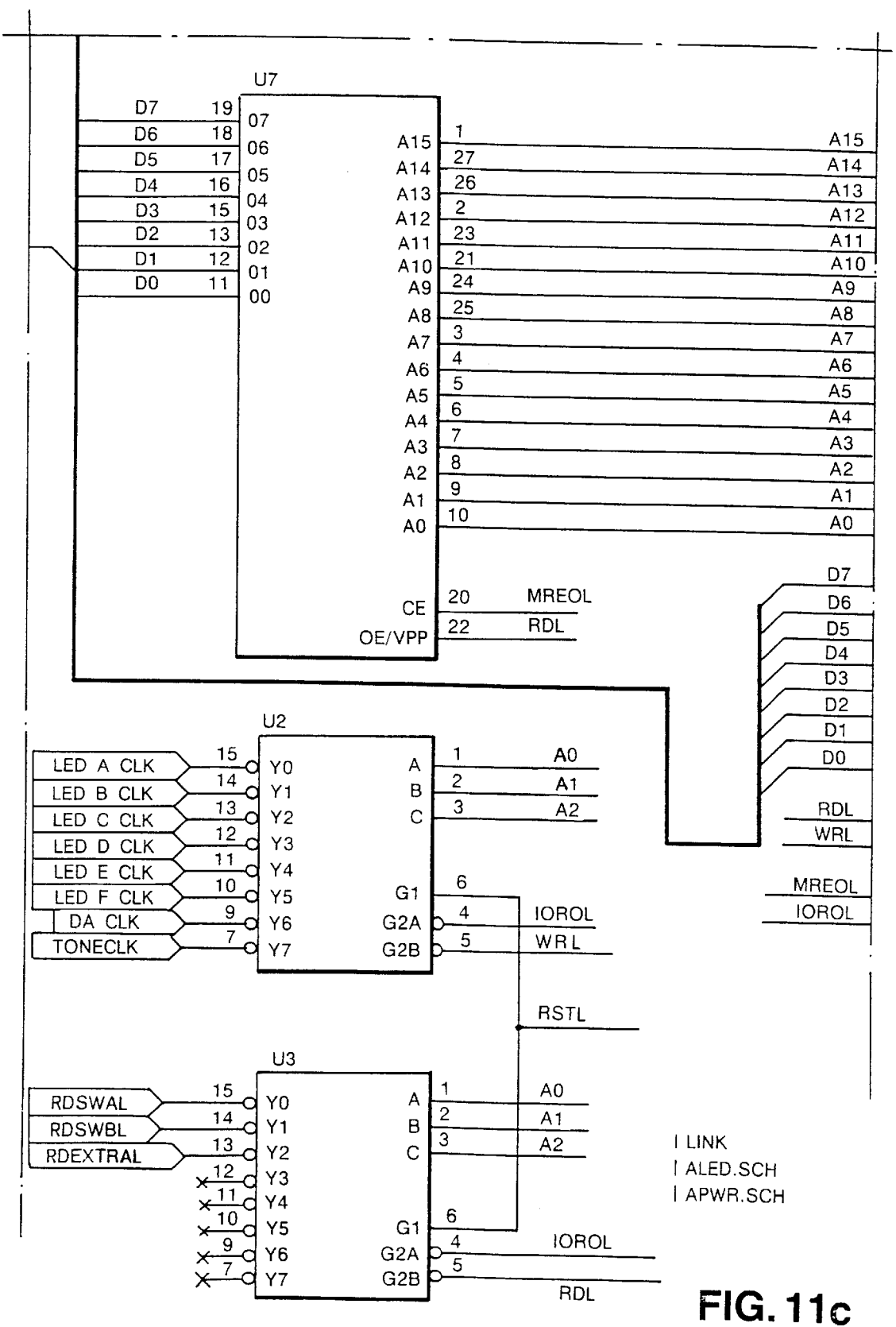
Figure 11D:
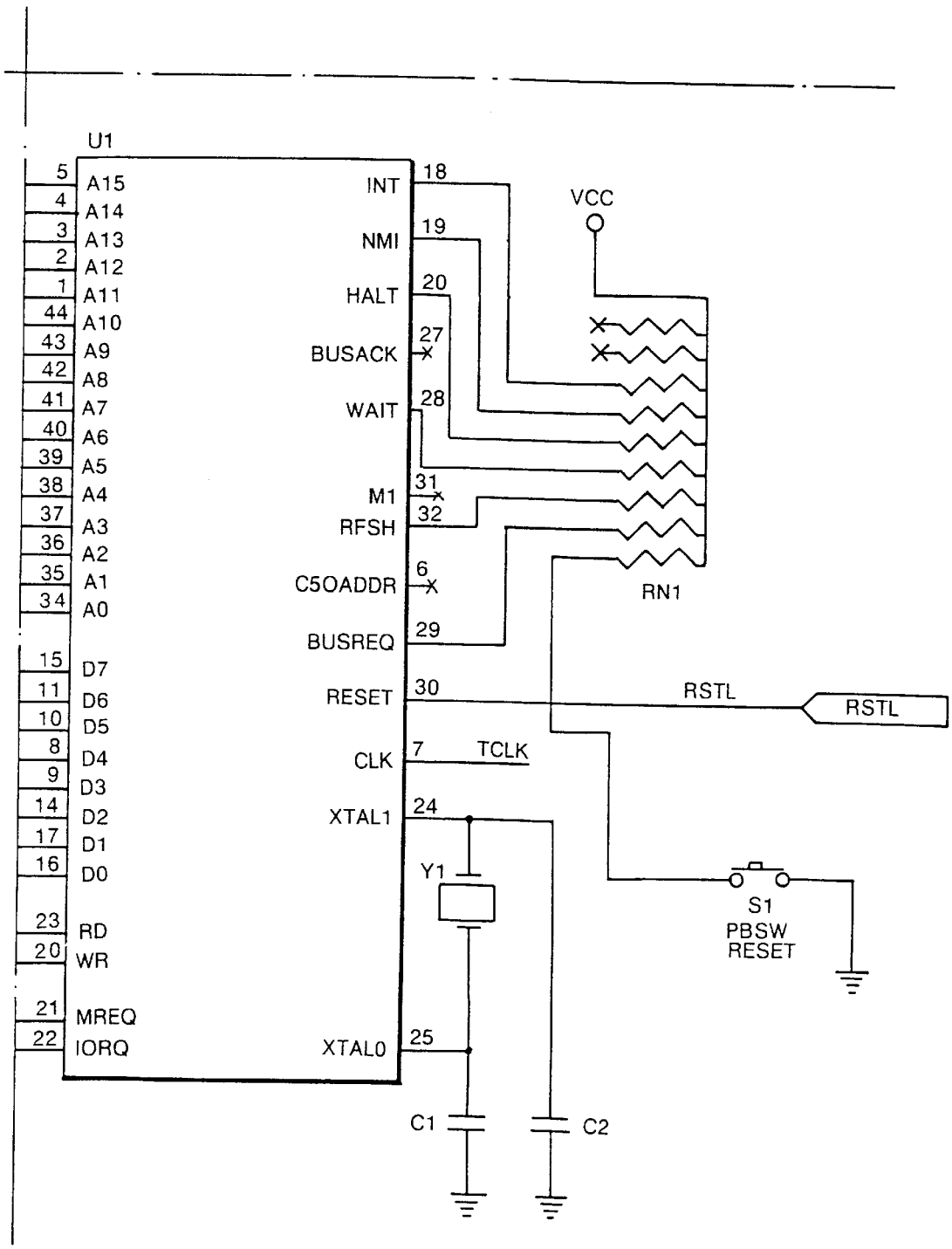

FIGS. 8–10 illustrate the arrangement of keys and lights on the front panel of an instrument according to the invention.

Figure 12A:
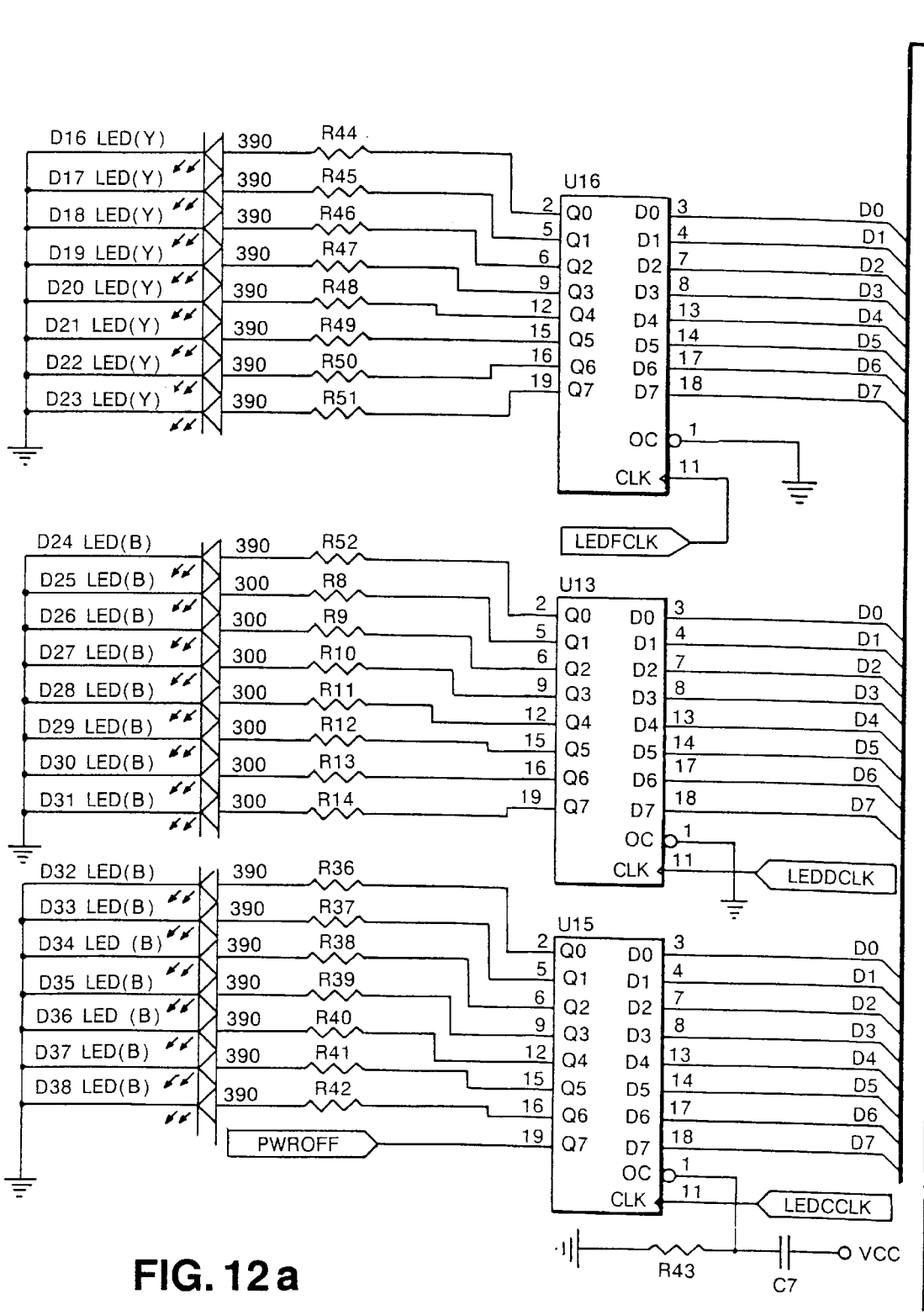
Figure 12B:
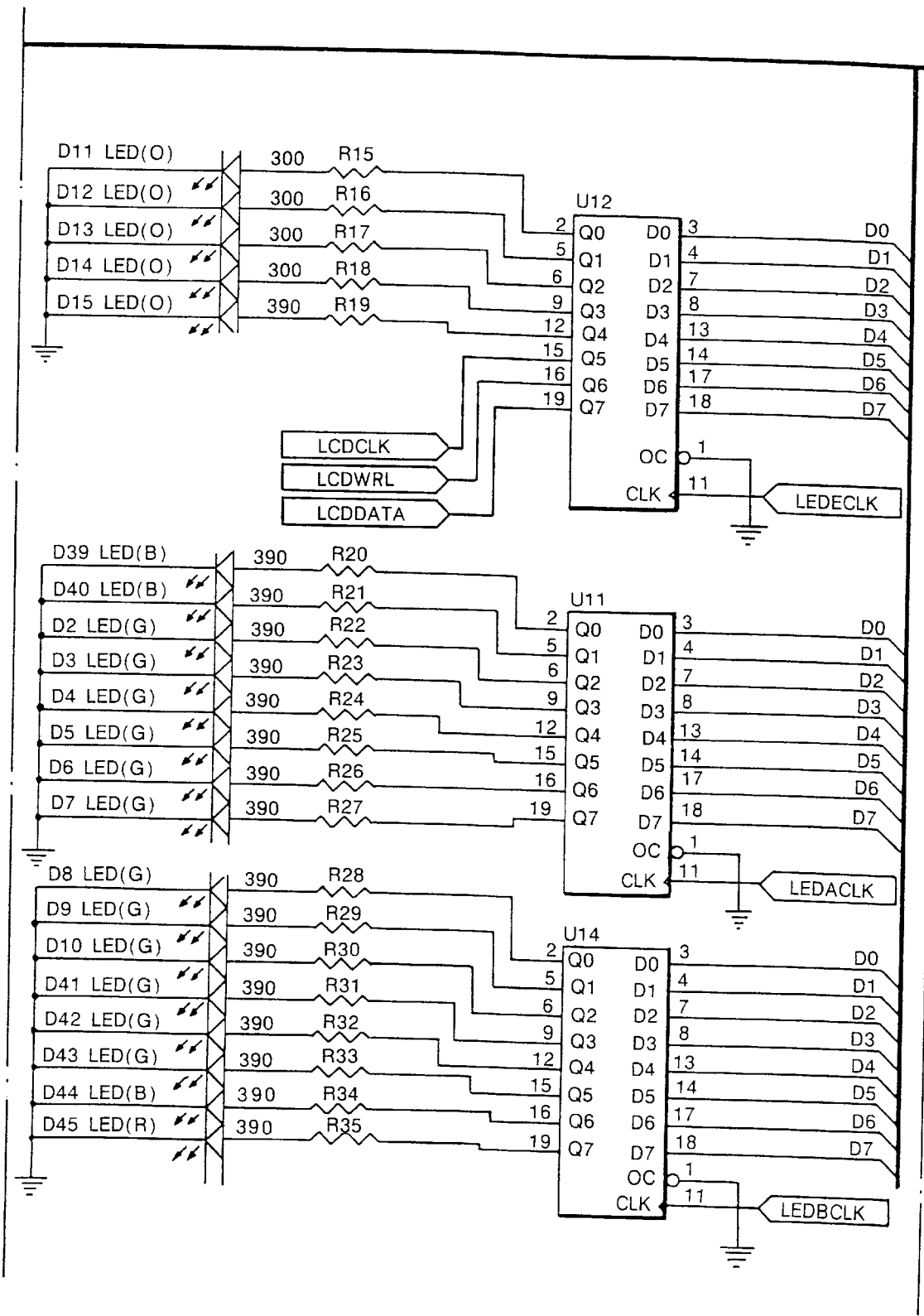
Figure 12C:
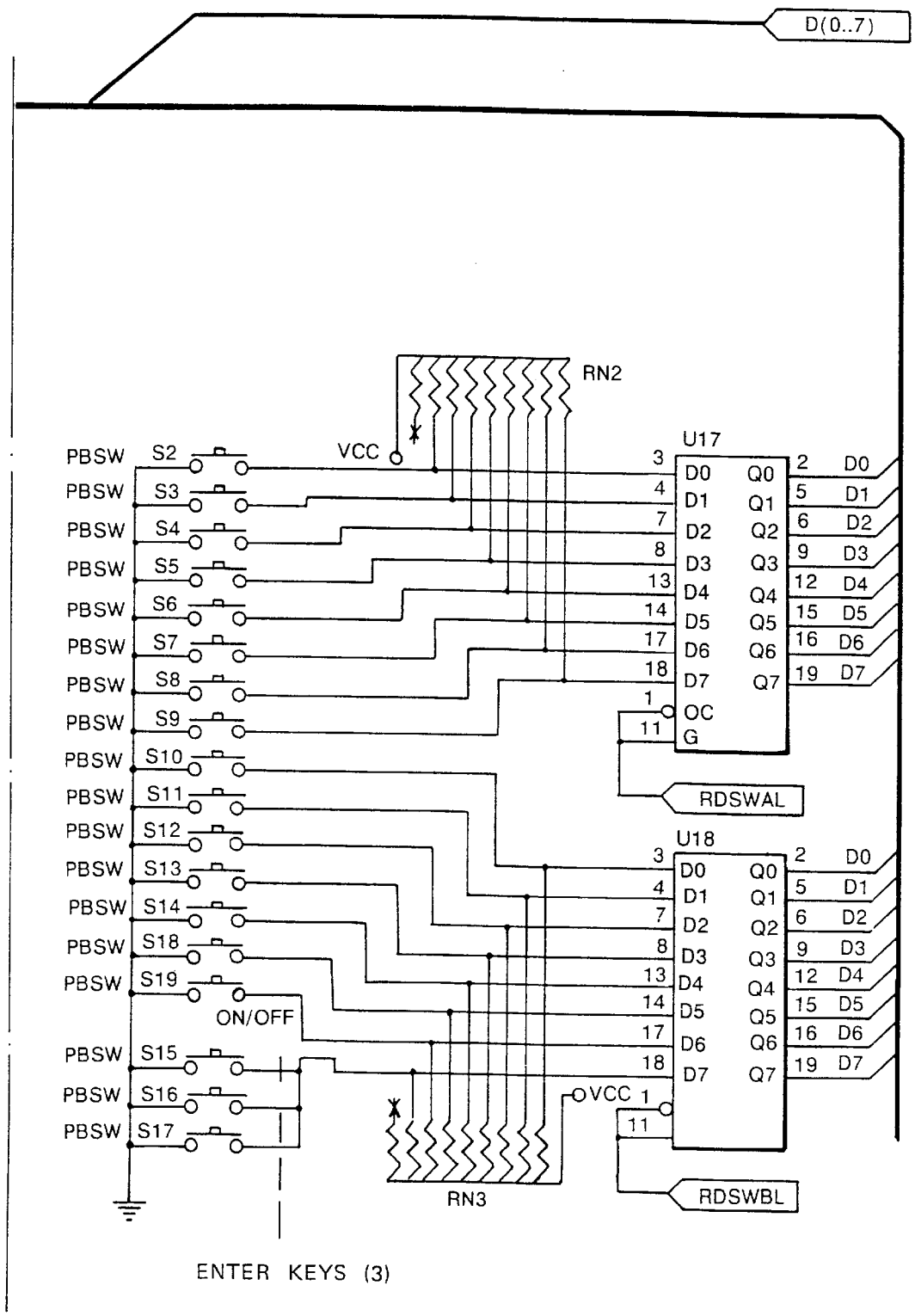
Figure 13:
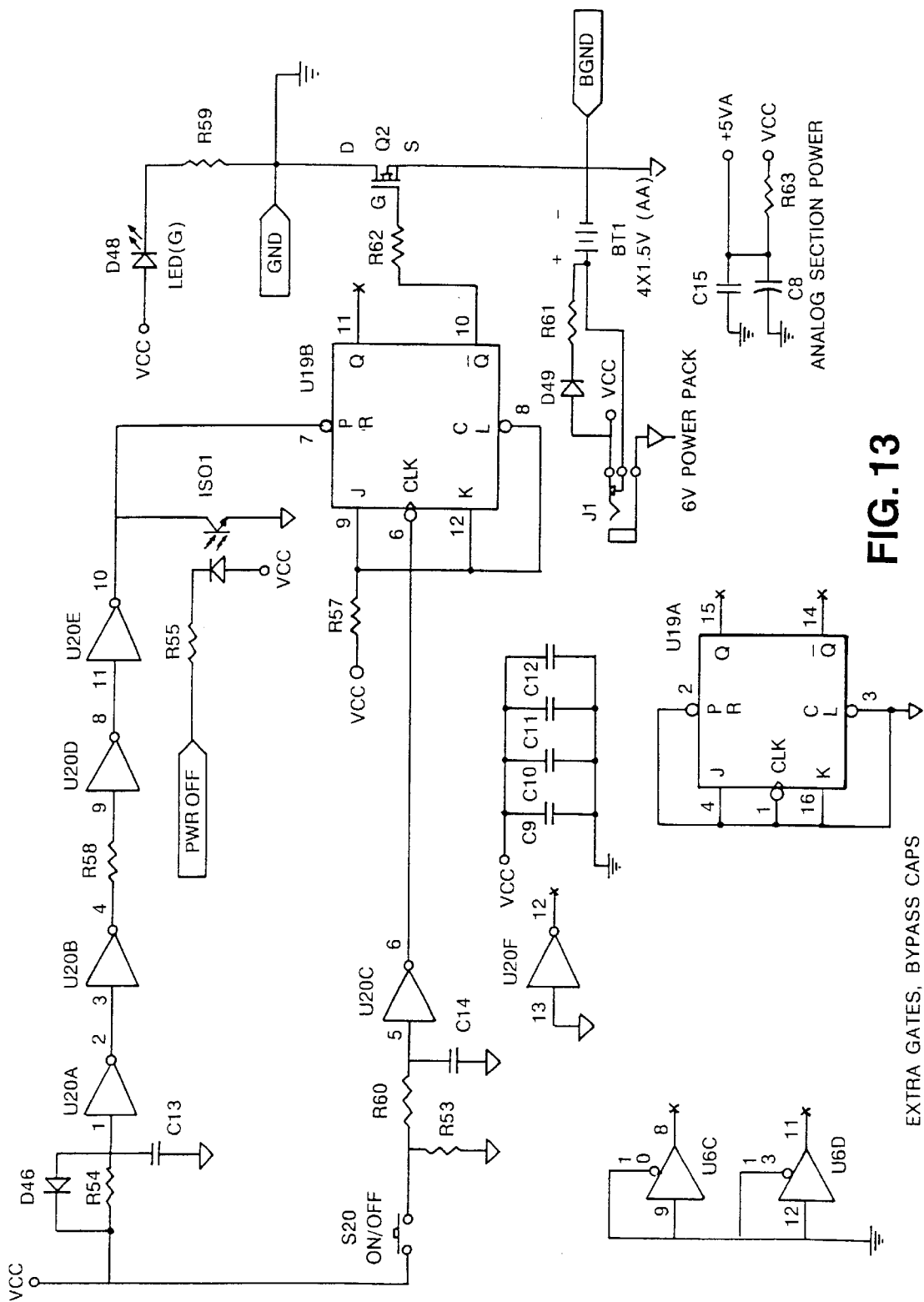

FIGS. 11–13 are circuit diagrams for an instrument according to the invention.

In the lower section of the front panel illustrated in FIGS. 8–10 is the keyboard section with keys S1–S20 as marked in FIG. 8 for entering data and making appropriate selections of, for example, mode or tempo. The function of each of these keys is described below.

FIG. 8 illustrates the connection references of each of the keys and these connection references are indicated in parenthesis in the following list. The keys are arranged in groups according to their function and these group are indicated by the respective letters a–h.

a. Selection of mode

Key 1 "Verse" (S13) selection of verse/cancellation of entry but retaining option.

Key 2 "Free" (S14) selection of prose of free types of Arabic verse or of verse in other languages/cancellation of entry but retaining option.

Key 3 "Game" (S15) selection of training and games/ cancellation of entry but retaining option.

b. Selection of tempo

Key 4 "Slow" (S13) selection of a slow tempo.

Key 5 "Moderate" (S14) selection of a moderate tempo.

Key 6 "Fast" (S15) selection of a rapid tempo.

c. Entering

Key 7 "Maqta'" (S16) entering a maqta' ot its substitute.

Key 8 "Short Syllable" (S9) entering of a short syllable at the end of a hemistich, line or unit.

Key 9 "Consonant" (S7) entering a consonant at the end of a hemistich or line.

d. Cancelling

Key 10 "Unit" (S3) cancelling units entered, one by one.

Key 11 "Hemistich" (S2) cancelling one or two hemistichs, one after the other.

Key 12 "Total" (S1) cancelling of all data entered and returning to pre-selection of mode.

e. Response

Key 13 "Yes" (S5) responding yes to the questions:rhyme ? hemistich?

Key 14 "No" (S4) responding no to the questions:rhyme ? hemistich?

f. Ending

Key 15 "Ending" (S8) ending of hemistich, line or unit.

g. Returning

Key 16 "Replay" (S6) returning an entry, after ending.

h. Sound

Key 17 "Sound" (S19) with or without sound.

A power switch marked (S20) is located in the lower right-hand corner of the panel. A display section consists of ten digits LCD display. This is used to display the result of entering data on Key S16. The panel is arranged to be convenient to an Arabic speaker and hence to someone more familiar with reading from right to left rather than from left to right. The LCD display in FIG. 8 indicate the entered data by displaying any one of the numbers 1–4 or a middle position hyphen or an apostrophe depending on the data entered. 1 corresponds to a unitary maqta', 2 to a binary maqta', 3 to a tertiary maqta' and 4 to a quaternary maqta'. The middle position hyphen corresponds to a consonant appended to a prior maqta' at the end of a hemistich, line or unit. However an apostrophe at the top of the display corresponds to a short syllable appended to a prior maqta' at the end of a hemistich, line or unit.

The select section consists of five lights which are preferably LEDs and which are used to indicate the options available when first entering tha data:

Light 1 (D41) indicates the option of a unitary maqta'.

Light 2 (D10) indicates the option of a binary maqta'.

Light 3 (D9) indicates option of a tertiary maqta'.

Light 4 (D8) indicates option of a consonant.

Light 5 (D7) indicates the option of ending.

The signals and questions section comprises nine more lights, preferably LEDs, which serve the following purposes:

Light 6 (D40) poses the question of mode:verse, free, game?.

Light 7 (D39) poses the question about the tempo required.

Light 8 (D42) a signal of readiness for entering the first hemistich.

Light 9 (D43) a signal of readiness for entering the second hemistich.

Light 10 (D37) a signal of readiness for entering prose, or free kinds of verse or any other beat outside speech.

Light 11 (D38) indicates that the entry is not sufficient or is incomplete.

Light 12 (D36) asks about the presence of rhyme at the end of the first hemistich.

Light 13 (D35) asks whether the verse is composed of one hemistich only.

Light 14 (D44) analyses entering by a flashing light.

The results section in FIG. 8 also comprises three LEDs D30, D32 & D34. These indicate whether or not the line of verse is complete. D32 indicates that the liner of verse is complete whereas D34 indicates that the line of verse lacks a third and D30 indicates that the line of verse lacks two-thirds.

The upper middle section of the panel comprises LEDs indicating the ancient meters comprising the two LEDs D18 & D19 belonging to the second beat group illustrating the two elementary meters. The other ancient meters are illustrated by the LEDs D16 of the first group. D20 of the second group, and D21 & D22 of the second group.

The exemplary classical meters comprise D2, D17 and D3 of the first group. D4 and D5 of the Second group and D6 of the third group. The post classical meters are illustrated by LEDs D11 of the first group. D12 of the second group and D13 & D14 of the third group.

The section to the upper left area of the panel comprises a set of LEDs indicating the combinations of the first and second hemistich in the same line of verse and in the poem. D24 indicates the first combination, D26 indicates the second combination, D29 indicates the third, D25 indicates the fourth, D27 indicates the fifth and D28 indicates the sixth combination.

In addition D31 indicates that the verse is of the hemistich kind and D33 indicates the (exceptional) case when two hemistiches are identical as regards their measure because the same rhyme is present in the first and second hemistich.

The correctness of the composition is indicated by the LED D23 which indicates that the first hemistich of a verse whose meter belongs to the first beat group lacks a short syllable at its beginning. D15 indicates that the maqta' or hemistich is of a rare type or is a theoretical construct (?) of classical prosody (?). D45 indicates the presence of a fracture.

FIGS. 11–13 show the circuit design of the hardware wired behind the front panel of FIGS. 8–10.

FIG. 11 illustrates a microprocessor, memory, LCD and sound circuit. The microprocessor U1 is conveniently the Z80C50 CPU to which 64K of EPROM U7 is connected. In this particular embodiment only 62K of the EPROM is used. The CPU U1 is equipped with 2 K of SRAM internally which is used to store the various variables. The microprocessor runs conveniently at 4 MHz and this is provided by crystal Y1 of value 8 MHz. Terminals INT, NMI, HALT, WAIT, RFSH, BUSREQ and RESET of the CPU U1 are connected to a resistor pack RN1 of value 10K. The RESET terminal of the CPU is connected to a push-button switch S1 through a resistor 10K of RN1.

The data on data bus D0–D7 is fed into and out of the data terminals of microprocessor U1 and the address data is fed out from the microprocessor U1 on the address bus identified in FIGS. 11. The memory request (MREQ) and read (RD) line are used to select the EPROM U7. Address line A0–A15are used to address the memory cells of the EPROM U7.

A decoder composed of two address decoders 74HC138 (U2 and U3) are used to access the different input and output sections. U2 is used to decode I/O addresses of the output sections, whereas U3 is used to decode I/O addresses of the input section. Address bits A0–A2 of the CPU are connected to the input of the two decoders (A,B and C respectively) enabling the selection of 8 different data ports. IOREQ line of the CPU is connected to G2A input of the two decoders, and WR line is connected to G2B of U2 for accessing output ports. Whereas, RD line is connected to G2B of U3 accessing input ports. G1 (active high), G2A (active low), and G2B (active low) lines are used to enable the two decoders when accessing I/O ports.

Moreover, FIG. 11 shows the LCD sub-section which is used to display a representation of the input sequence or to display stored sequences upon request. The LCD display is a 10-digits display with 2 annunciators (apostrophe and point) per digit. The LCD display is driven by a triplexed LCD decoder/driver chip U4 preferably the MAX7232C. The MAX7232C drives 10 digits and accepts data in serial format. The CLK, WRITE and DATA line a of the MAX7232C are taken from data bits 5, 6, and 7 through U12 which is a 74HC374 shown in FIG. 12. The ACCEPT line of U4 is connected to the data bus bit DO through a tri-state buffer 74HC125 (UA6). Therefore, writing to the MAX7232C input lines is done through output port address (Ø4H) bits 5, 6, and 7. A potentiometer—resistor network (R1 and R2) is used to control the contrast of the LCD display by connecting it to pin VDISP of U4.

The sound sub-section in FIG. 11 is based on the ISD1016A (U9) which is high-quality, single-chip record/playback for 16 seconds messaging applications. One may use a 60 seconds chip. Each segment in the chip is accessed through addressed A0 through A7. In this instrument, addresses A0–A2 of the ISD1016A are connected to ground and addresses A3–A7 are connected to the data bus of the CPU (D0–D4) through a latch/buffer 74HC374 (U8). The XCLK input is connected to ground. The SP+ and SP− of the ISD1016A provide direct drive for loudspeakers LS1. One may use an audio amplifier based on the MC34119 to amplify further the sound output (not shown in Figures).

FIG. 12 shows the circuit diagram of the keyboard and LEDs display section.

The keyboard section is composed of two 74HC373 latches (U17 and U18). The keyboard keys are composed of 16 push-button conveniently soft-touch keys connected to the inputs of D0–D7 of U18 and U17. The latches outputs (Q0–Q7) which indicate the current key pressed are connected to data bus D0–D7. When no key is pressed, the input of U17 and U18 are driven high through the use of resistor packs RN2 and RN3 of value 10K. The decoded IO addresses by U3 (FIG. 11), provides two lines (RDSWAL and RDSWBL) which are used to latch data and enable the latches buffers to the data bus. RDSWAL and RDSWBL are connected to OC and G of U17 and U18 respectively.

The LED sub-section is composed of 44 LEDs driven by six 74HC374 edge triggered latches/buffers (U11 to U16). Each 74HC374 is capable of driving 8 LEDs through limiting current resistors. Different color LEDs are used to indicate different functions. The OC (active low) input of U11, U12, U13, U14 and U16 which enable the output of the flip-flops are connected to ground. Latching data to each latches/buffers is done through input line CLK which is connected to decoder output (U2) shown in FIG. 11.

U15's Q7 output is connected to an opto-isolator circuit to shut-off the system power through software control. The OC input of U15 is connected to a resistor-capacitor (R43 and C7) of value 100K and 0.1u respectively which act as a delay.

FIG. 13 shows the power supply and power control circuit diagram. The equipment described herein is powered by four AA size battery cells providing 6 volts of voltage. An optional D.C. power pack of 6V @ 200 mA, connected at J1, may be used to operate the instrument from an A.C. outlet. One may use instead of the standard AA batteries four AA rechargable batteries. Resistor R61 of value 100 Ohm and diode D41 of value 1N5817 are used to charge the batteries. From the 6V (labeled Vcc) is derived the 5V needed by the circuit's chips through step down resistor R10 of value 10 Ohm. 1 Watt. Bypass capacitors C15 and C8 are used at the +5VA power line, and C9–C12 for the power line Vcc.

The power control section is controlled by a transistor Q2 (2N7014 or equivalent) whose gate line is connected to the Q output of a JK flip-flop (U19A) through resistor R62 of value 10K. This flip-flop is connected in the toggle mode by connecting the J.K inputs to Vcc through resistor R57 of value 100k. The system is turned on/off by push-button S20 which is connected to a debouncing circuit made of resistor R60 (100k) and capacitor C14 (0.1 uF) and connected to an inverting buffer U20C (14584BTV) whose output is connected to the clock input of U19B. The instrument on state is indicated by optional LED (D48) and current limiting resistor R59 (390 Ohm) connected to the drain of Q2. The PR (preset) line of the JK flip-flop is connected to an inverting buffer network (U20A, U20B, U20D and U20E), resitors (R58 AND R54), capacitor (C13) and diode (D46). D46 (1N4148) is used to discharge capacitor C13 when power source is removed from instrument. Opto-isolater (ISO1) is used to turn the instrument off.

What is claimed:

1. An instrument for the analysis of rhythmic measures of speech comprising at least one input device having means for manual input solely of a series of discrete input signals representing an input rhythm corresponding to a spoken sequence of syllables, and an output device responsive to the discrete input signals to provide a representation of the input rhythm of a group of the discrete input signals and an indication of a correspondence of said group to a known or predetermined rhythmic group of rhythmic measures of speech stored in the instrument, thus to provide an analysis of the relationship between the spoken sequence of syllables and the known or predetermined rhythmic group.

2. A instrument as claimed in 1 wherein the output device provides at least one of a visual and an aural representation of the input rhythm.

3. An instrument as claimed in claim 2 wherein the output device provides a visual representation in the form of one of a numeric display and an alpha-numeric display.

4. An instrument as claimed in claim 3 further comprising a display screen comprises symbols representing different rhythmic measures of speech.

5. An instrument as claimed in claim 1 wherein the output device comprises a store storing therein at least one signal set representing the known or predetermined rhythm, a comparator for comparing the input signals with at least one stored signal set, and signaling means indicating a relationship between the rhythms represented by the input signals and the stored signal set.

6. An instrument as claimed in claim 5 wherein the store stores therein a plurality of the signal sets, each signal set representing a respective predetermined rhythm, and wherein a selector device is provided to permit selection of a particular signal set for comparison with the input signals in the comparator.

7. An instrument as claimed in claim 6 wherein the signal sets represent the rhythms of different forms of verse.

8. An instrument as claimed in claim 5 wherein the output device is selectively operable to provide at least one of a visual and an aural representation of the stored signal set or the selected signal set.

9. An instrument as claimed in claim 5, wherein the comparator is arranged to cause the signaling means to indicate agreement between the input signals and the signal set.

10. An instrument as claimed in claim 5, wherein the comparator is arranged to cause the signaling means to indicate a rhythm in continuation of that of the input signals in response to agreement between the input signals and the signal set.

11. An instrument as claimed in claim 5, wherein the comparator is arranged to cause the signaling means to indicate an error or omission in response to a difference between the input signals and the signal set.

12. An instrument as claimed in claim 4 comprising selection means for selection of one of a plurality of tempi of operation of the instrument.

13. An instrument as claimed in claim 12 wherein selection can be made between slow, a fast, and an intermediate tempo.

14. An instrument as claimed in claim 4 comprising a storage device for storing the input signals and a recall device operable to provide a visual and/or an aural representation of input rhythm by reference to the stored input signals.

15. An instrument as claimed in claim 4 comprising a plurality of the input devices located for operation by a plurality of users.

16. The instrument of claim 1, wherein said means for manual input comprises at least one input key.

17. The instrument of claim 1, further comprising an indicator that indicates a completeness of a line of verse formed by the spoken sequence of sounds.

18. An instrument for analyzing an input rhythm, comprising:
an input device comprising plural input keys for manual input solely of a series of discrete input signals corresponding to a rhythm of a sequence of spoken sounds;
a memory for storing plural series of known rhythmic groups of rhythmic measures of speech;
a comparator for comparing a rhythm of the series of discrete input signals to at least one of said plural series of known rhythmic groups stored in the instrument; and
an output for indicating a result from said comparator and comprising plural visual indicators for indicating at least one of completeness of a line of verse formed by the input sequence of spoken sounds and a classification of a meter of the input sequence of sounds, thereby providing an indication of the relationship of the rhythm of the series of discrete input signals to a one of said plural series of known rhythmic groups.

19. The instrument of claim 18, wherein said input keys comprise separate keys for different sounds.

20. The instrument of claim 18, wherein one of said plural visual indicators indicates the completeness of a line of verse formed by the input sequence of spoken sounds.

21. A method of analyzing rhythmic measures of speech comprising the steps of:
speaking a sequence of syllables;
manually entering into an analysis device with keystrokes a series of discrete input signals having an input rhythm corresponding to the spoken sequence of syllables;
comparing in the analysis device the input rhythm of the series of discrete input signals to at least one of plural known rhythmic groups of rhythmic measures of speech stored in the analysis device;
providing as an output from the analysis device a representation of the input rhythm; and
providing as a further output from the analysis device a result of the comparing step indicating a correspondence of the input rhythm to a one of the known rhythmic groups of rhythmic measures of speech, thereby providing an analysis of a relationship between the spoken sequence of syllables to the one of the known rhythmic groups.

22. The method of claim 21, wherein the step of providing as an output a representation of the input rhythm comprises the step of providing on the analysis device a visual representation of the input rhythm.

23. The method of claim 21, wherein the step of providing as an output a representation of the input rhythm comprises the step of providing on the analysis device a aural representation of the input rhythm.

24. The method of claim 21, further comprising the step of selecting one of the known rhythmic groups of rhythmic measures of speech before the comparing step, and wherein the comparing step comprises the step of comparing the series of discrete input signals to the selected one of the known rhythmic groups.

25. The method of claim 21, wherein the spoken sequence of syllables is poetry and the known rhythmic groups are different forms of a verse.

26. The method of claim 25, further comprising the step of providing as an output a representation of a completeness of a line of the verse.

27. The method of claim 21, further comprising the step of indicating at the analysis device a rhythm that is a continuation of the one of the known rhythmic groups after an end of the manual entry of the discrete input signals.

28. The method of claim 21, further comprising the step of indicating a lack of correspondence between the spoken sequence of syllables and the one of the known rhythmic groups.

* * * * *